United States Patent
Di et al.

(10) Patent No.: US 11,449,719 B2
(45) Date of Patent: Sep. 20, 2022

(54) IMAGE EVALUATION

(71) Applicant: eBay Inc., San Jose, CA (US)

(72) Inventors: Wei Di, Cupertino, CA (US); Vignesh Jagadeesh, Santa Clara, CA (US); Robinson Piramuthu, Oakland, CA (US); Elizabeth Churchill, San Francisco, CA (US); Anurag Bhardwaj, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/225,338

(22) Filed: Dec. 19, 2018

(65) Prior Publication Data

US 2019/0122083 A1    Apr. 25, 2019

Related U.S. Application Data

(63) Continuation of application No. 15/151,435, filed on May 10, 2016, now Pat. No. 10,176,406, which is a (Continued)

(51) Int. Cl.
*G06K 9/00* (2022.01)
*G06K 9/62* (2022.01)
(Continued)

(52) U.S. Cl.
CPC .......... *G06K 9/6277* (2013.01); *G06F 16/58* (2019.01); *G06F 16/5854* (2019.01);
(Continued)

(58) Field of Classification Search
CPC ....... G06K 9/6277; G06K 9/46; G06K 9/6267
See application file for complete search history.

(56) References Cited

U.S. PATENT DOCUMENTS 5,633,948 A    5/1997   Kegelmeyer
5,987,456 A   11/1999   Ravela et al.
(Continued)

FOREIGN PATENT DOCUMENTS

CN    102799669 A   11/2012
CN    103106265 A    5/2013
(Continued)

OTHER PUBLICATIONS

A Probabilistic Clothes Recommender Based on Clothes Features, Hu Xiao-song et al., IEEE, 978-1-4799-5376-9, 2014, pp. 76-81 (Year: 2014).*

(Continued)

*Primary Examiner* — Jayesh A Patel
(74) *Attorney, Agent, or Firm* — Holland & Hart LLP

(57) ABSTRACT

A machine may be configured to perform image evaluation of images depicting items for sale and to provide recommendations for improving the images depicting the items to increase the sales of the items depicted in the images. For example, the machine accesses a result of a user behavior analysis. The machine receives an image of an item from a user device. The machine performs an image evaluation of the received image based on an analysis of the received image and the result of the user behavior analysis. The performing of the image evaluation may include determining a likelihood of a user engaging in a desired user behavior in relation to the received image. Then, the machine generates, based on the evaluation of the received image, an output that references the received image and indicates the likelihood of a user engaging in the desired behavior.

18 Claims, 18 Drawing Sheets

Related U.S. Application Data continuation of application No. 14/319,224, filed on Jun. 30, 2014, now Pat. No. 9,384,422.

(60) Provisional application No. 61/975,608, filed on Apr. 4, 2014.

(51) Int. Cl.

| | |
|---|---|
| *G06F 16/58* | (2019.01) |
| *G06F 16/583* | (2019.01) |
| *G06V 10/40* | (2022.01) |
| *G06Q 30/06* | (2012.01) |
| *G06Q 30/02* | (2012.01) |
| *G06F 16/60* | (2019.01) |
| *G06F 16/63* | (2019.01) |

(52) U.S. Cl.
CPC .............. *G06F 16/60* (2019.01); *G06F 16/63* (2019.01); *G06K 9/6267* (2013.01); *G06Q 30/0201* (2013.01); *G06Q 30/0601* (2013.01); *G06Q 30/0613* (2013.01); *G06V 10/40* (2022.01)

(56) References Cited

U.S. PATENT DOCUMENTS

| | | | | |
|---|---|---|---|---|
| 6,041,311 | A * | 3/2000 | Chislenko | G06Q 30/0631 |
| | | | | 705/26.7 |
| 6,958,821 | B1 | 10/2005 | McIntyre | |
| 8,146,784 | B1 * | 4/2012 | Calanca | A47G 25/4061 |
| | | | | 211/85.3 |
| 8,332,429 | B2 * | 12/2012 | Poirier | G06F 16/5866 |
| | | | | 707/781 |
| 8,429,173 | B1 | 4/2013 | Rosenberg et al. | |
| 8,467,613 | B2 | 6/2013 | Baker et al. | |
| 8,525,828 | B1 * | 9/2013 | Bates | G06T 15/00 |
| | | | | 705/26.7 |
| 8,620,912 | B2 | 12/2013 | Wang et al. | |
| 8,675,957 | B2 * | 3/2014 | Goswami | G06T 7/0002 |
| | | | | 382/162 |
| 8,737,728 | B2 * | 5/2014 | Bhardwaj | G06T 7/13 |
| | | | | 382/165 |
| 8,898,581 | B2 * | 11/2014 | Homma | G06Q 30/0625 |
| | | | | 705/347 |
| 9,141,985 | B1 * | 9/2015 | Wiebe | G06Q 30/0643 |
| 9,384,422 | B2 * | 7/2016 | Di | G06V 10/40 |
| 9,984,402 | B2 * | 5/2018 | Cao | G06V 10/40 |
| 10,176,406 | B2 * | 1/2019 | Di | G06K 9/6267 |
| 2008/0270478 | A1 * | 10/2008 | Liu | G06F 16/583 |
| | | | | 707/E17.02 |
| 2009/0024580 | A1 | 1/2009 | Obrador | |
| 2009/0046145 | A1 * | 2/2009 | Simon | H04N 7/18 |
| | | | | 348/E7.085 |
| 2009/0116698 | A1 * | 5/2009 | Zhang | G06Q 30/0601 |
| | | | | 345/581 |
| 2009/0129642 | A1 | 5/2009 | Matsumoto | |
| 2009/0171755 | A1 * | 7/2009 | Kane | G06Q 30/0601 |
| | | | | 705/26.1 |
| 2009/0171766 | A1 | 7/2009 | Schiff et al. | |
| 2009/0171783 | A1 * | 7/2009 | Raju | G06F 16/58 |
| | | | | 358/1.15 |
| 2009/0240683 | A1 * | 9/2009 | Lazier | G06F 16/3325 |
| | | | | 707/999.005 |
| 2009/0290813 | A1 | 11/2009 | He | |
| 2009/0300055 | A1 | 12/2009 | Mestha et al. | |
| 2010/0325015 | A1 * | 12/2010 | Westphal | G06Q 30/02 |
| | | | | 705/26.7 |
| 2011/0034176 | A1 * | 2/2011 | Lord | H04M 1/72457 |
| | | | | 348/241 |
| 2011/0211728 | A1 | 9/2011 | Inose | |
| 2011/0235902 | A1 * | 9/2011 | Chittar | G06T 7/90 |
| | | | | 382/162 |
| 2011/0273535 | A1 * | 11/2011 | Mendelson | G06K 9/00 |
| | | | | 348/43 |
| 2011/0314031 | A1 * | 12/2011 | Chittar | G06F 16/5854 |
| | | | | 707/E17.019 |
| 2011/0320423 | A1 * | 12/2011 | Gemmell | G06F 16/9535 |
| | | | | 707/706 |
| 2012/0059819 | A1 * | 3/2012 | Wheeler | G06F 16/248 |
| | | | | 707/E17.084 |
| 2012/0114249 | A1 * | 5/2012 | Conwell | H04N 5/23219 |
| | | | | 382/190 |
| 2012/0117519 | A1 | 5/2012 | Parikh | |
| 2012/0128239 | A1 * | 5/2012 | Goswami | G06F 16/24578 |
| | | | | 382/173 |
| 2012/0221578 | A1 | 8/2012 | Kim | |
| 2012/0259882 | A1 * | 10/2012 | Thakur | G06F 16/9535 |
| | | | | 707/E17.074 |
| 2012/0303615 | A1 * | 11/2012 | Goswami | G06V 20/695 |
| | | | | 707/723 |
| 2012/0321131 | A1 * | 12/2012 | Kobayashi | H04N 1/00183 |
| | | | | 382/103 |
| 2013/0053141 | A1 * | 2/2013 | Guerin | A63F 13/46 |
| | | | | 463/31 |
| 2013/0057691 | A1 * | 3/2013 | Atsmon | G06Q 10/0637 |
| | | | | 382/104 |
| 2013/0081082 | A1 * | 3/2013 | Riveiro Insua | H04N 21/8146 |
| | | | | 725/38 |
| 2013/0083999 | A1 * | 4/2013 | Bhardwaj | G06T 7/90 |
| | | | | 382/165 |
| 2013/0084000 | A1 * | 4/2013 | Bhardwaj | G06Q 30/0631 |
| | | | | 382/165 |
| 2013/0084001 | A1 * | 4/2013 | Bhardwaj | G06V 30/194 |
| | | | | 382/165 |
| 2013/0084002 | A1 * | 4/2013 | Bhardwaj | G06K 9/6215 |
| | | | | 382/165 |
| 2013/0085893 | A1 * | 4/2013 | Bhardwaj | G06F 16/583 |
| | | | | 705/26.62 |
| 2013/0136363 | A1 * | 5/2013 | Na | G06K 9/628 |
| | | | | 382/190 |
| 2013/0179288 | A1 * | 7/2013 | Moses | G01B 11/022 |
| | | | | 705/26.1 |
| 2013/0208085 | A1 * | 8/2013 | Marion | H04N 7/18 |
| | | | | 348/36 |
| 2013/0343615 | A1 * | 12/2013 | Zhang | G06V 20/10 |
| | | | | 382/111 |
| 2014/0032359 | A1 * | 1/2014 | Dewangan | G06Q 30/0631 |
| | | | | 705/26.7 |
| 2014/0052584 | A1 * | 2/2014 | Gershon | G09G 5/06 |
| | | | | 705/26.63 |
| 2014/0180758 | A1 * | 6/2014 | Agarwal | G06Q 30/06 |
| | | | | 705/7.29 |
| 2015/0134773 | A1 * | 5/2015 | Salem | G16H 40/67 |
| | | | | 709/217 |
| 2015/0286898 | A1 | 10/2015 | Di et al. | |
| 2016/0253582 | A1 | 9/2016 | Di et al. | |

FOREIGN PATENT DOCUMENTS

| | | | |
|---|---|---|---|
| CN | 103106586 A | * | 5/2013 |
| CN | 106164837 A | | 11/2016 |
| CN | 111612011 A | * | 9/2020 |
| WO | 2015/153896 A1 | | 10/2015 |

OTHER PUBLICATIONS

Clothes Style Recommendation System, W.H. Hsieh et al., IEEE, 978-1-4799-1282-7, 2013, pp. 137-140 (Year: 2013).*

A Persuasive Interactive Mannequin for Shop Windows, W. Reitberger et al., ACM, 978-1-60558-376-1, Apr. 26-29, 2009, pp. 1-8 (Year: 2009).*

Office Action received for Chinese Patent Application No. 201580018485.X, dated Apr. 1, 2019, 24 pages (14 pages of English Translations and 10 pages of Official Copy).

Response to Office Action filed on Jun. 14, 2019 for Chinese Patent Application No. 201580018485.X, dated Apr. 1, 2019, 13 pages (8 pages of English Translation and 5 pages of Official Copy).

(56) References Cited

OTHER PUBLICATIONS

Anonymous, "Model-it: The Story of Little Black Dress", H.5.1 Multimedia Information Systems: Evaluation/Methodology, Nov. 19, 2013, pp. 1-4.
Di, et al., "Large Scale User Preference Analysis based Apparel Image Verification Principle & System", Nov. 19, 2013, pp. 1-2.
Supplemental Preliminary Amendment filed on Apr. 11, 2018, for U.S. Appl. No. 15/151,435, 7 pages.
Office Action received for Korean Patent Application No. 10-2016-7030955, dated Aug. 14, 2017, 7 pages. (3 pages of English Translation and 4 pages of Official copy).
Response to Office Action filed on Oct. 16, 2017 for Korean Patent Application No. 10-2016-7030955, dated Aug. 14, 2017, 15 pages. (10 pages of Official copy and 5 pages of English Pending Claims).
Office Action received for Chinese Patent Application No. 201580018485.X, dated Oct. 15, 2018, 18 pages (9 pages of English Translation and 9 pages of Official copy).
Response to Non-Final Office Action filed on Oct. 29, 2015, for U.S. Appl. No. 14/319,224, dated Sep. 22, 2015, 9 pages.
Office Action received for Korean Patent Application No. 10-2018-7011248, dated Jul. 16, 2018, 11 pages.(5 pages of English Translation and 6 pages of Official copy).
Response to Office Action filed on Sep. 14, 2018, for Korean Patent Application No. 10-2018-7011248, dated Jul. 16, 2018, 34 pages (26 pages of Official Copy and 8 pages of English Translation of Claims).
International Preliminary Report on Patentability received for PCT Application No. PCT/US2015/024112, dated Oct. 13, 2016, 7 pages.
International Search Report received for PCT Application No. PCT/US2015/024112, dated Jun. 22, 2015, 2 pages.
Written Opinion received for PCT Application No. PCT/US2015/024112, dated Jun. 22, 2015, 5 pages.
Non-Final Office Action received for U.S. Appl. No. 14/319,224, dated Sep. 22, 2015, 7 pages.
Notice of Allowance received for U.S. Appl. No. 14/319,224, dated Feb. 11, 2016, 15 pages.
Decision on Rejection received for Chinese patent Application No. 201580018485.X, dated Jul. 25, 2019, 8 pages (Only Official Copy).
Notice of allowance Received for Korean Patent Application No. 10-2016-7030955, dated Jan. 22, 2018, 4 pages (1 page of English translation and 3 pages of Official Copy).
Notice of Allowance received for Korean Patent Application No. 10-2018-7011248,dated Jan. 22, 2019, 5 pages (3 pages of Official copy and 2 pages of English Translation).
Response to Office Action filed on Feb. 26, 2019, for Chinese Patent Application No. 201580018485.X, dated Oct. 15, 2018, 17 pages(12 pages of official copy and 5 pages of English Pending claims).
Corrected Notice of Allowability received for U.S. Appl. No. 15/151,435 , dated Nov. 7, 2018, 5 pages.
Corrected Notice of Allowability received for U.S. Appl. No. 15/151,435, dated Sep. 19, 2018, 5 pages.
First Action Interview—Pre-interview Communication received for U.S. Appl. No. 15/151,435, dated Jan. 26, 2018, 5 pages.
Notice of Allowance received for U.S. Appl. No. 15/151,435, dated Aug. 27, 2018, 14 pages.
First Action Interview—Pre-Interview Communication received for U.S. Appl. No. 15/151,435, dated Apr. 19, 2018, 8 pages.
Preliminary Amendment received for U.S. Appl. No. 15/151,435, filed Jun. 10, 2016, 8 pages.
Response to First Action Interview—Pre-Interview Communication Filed on Jun. 19, 2018 For U.S. Appl. No. 15/151,435, dated Apr. 19, 2018, 10 pages.
Response to First Action Interview—Pre Interview Communication filed on Mar. 26, 2018 , for U.S. Appl. No. 15/151,435 , dated Jan. 26, 2018, 4 pages.
Response to Request for Reexamination filed on Nov. 8, 2019, for Chinese Patent Application No. 201580018485.X, dated Jul. 25, 2019, 12 pages (4 pages of English translation & 8 pages of official copy).
Re-Examination Notification Received for Chinese Patent Application No. 201580018485.X, dated Mar. 19, 2021, 12 pages (Official Copy Only).
Decision of Reexamination Received for Chinese Patent Application No. 201580018485.X, dated Jul. 29, 2021, 23 Pages (1 Page of English Translation & 22 Pages of Official Copy).

\* cited by examiner

IMAGE EVALUATION

CLAIM OF PRIORITY

This application is a continuation of and claims the benefit of priority to U.S. application Ser. No. 15/151,435, filed May 10, 2016, which is a continuation of U.S. application Ser. No. 14/319,224, filed Jun. 30, 2014, which claims the benefit of priority to U.S. Provisional Application No. 61/975,608, filed Apr. 4, 2014, each of which is hereby incorporated by reference in its entirety.

TECHNICAL FIELD

The subject matter disclosed herein generally relates to the processing of data. Specifically, the present disclosure addresses systems and methods to facilitate image evaluation.

BACKGROUND

Images depicting items for sale may be used to visually communicate information about the items for sale to potential buyers. For example, an online clothing store may use images to illustrate one or more items of merchandise available for purchase at the online clothing store. An image may display an item of clothing modeled by a person, displayed on a mannequin, or displayed flat (e.g., with neither a human model nor a mannequin).

BRIEF DESCRIPTION OF THE DRAWINGS

Some embodiments are illustrated by way of example and not limitation in the figures of the accompanying drawings.

DETAILED DESCRIPTION

Figure 1:
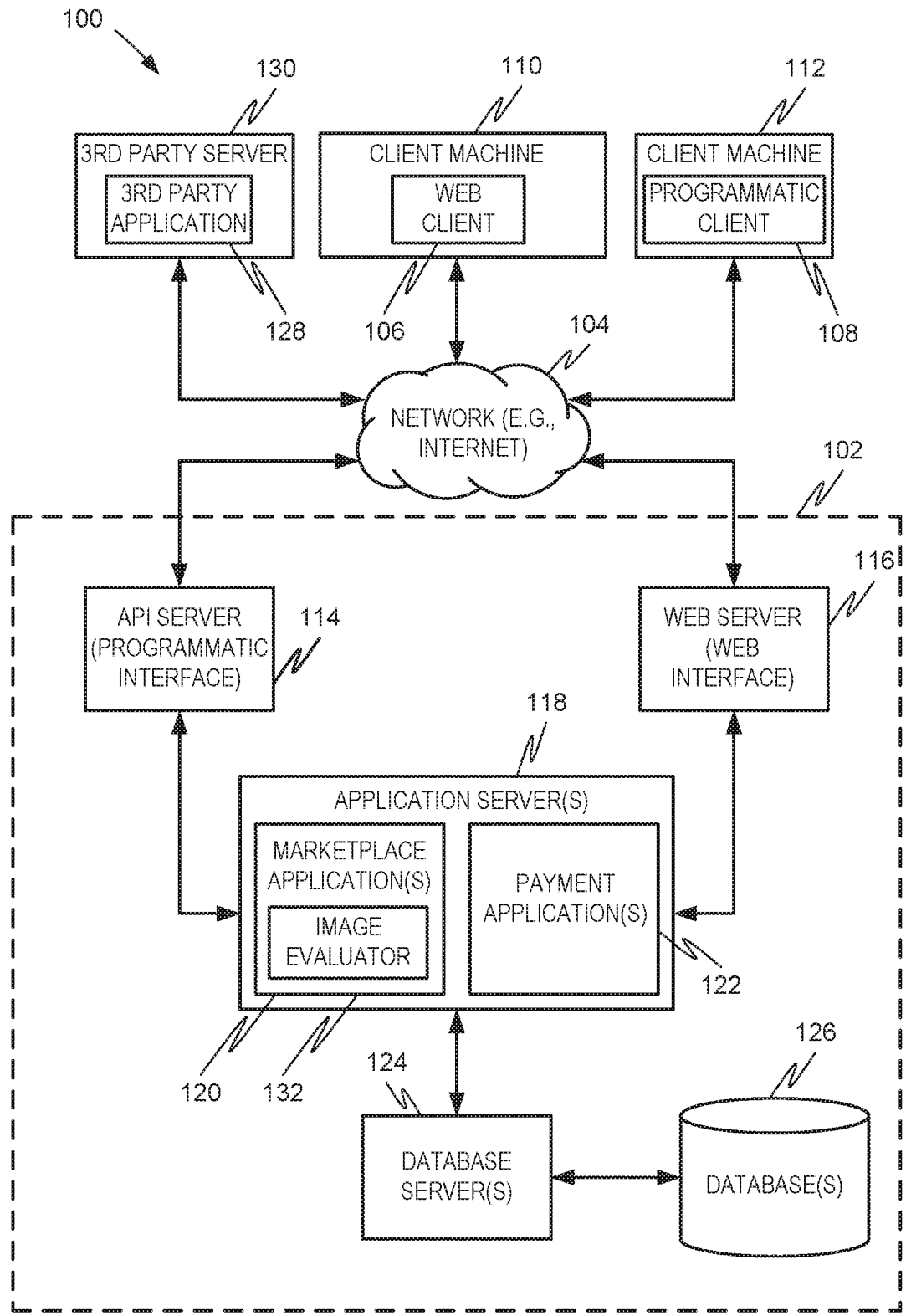
FIG. 1 is a network diagram depicting a client-server system, within which some example embodiments may be deployed.

Example methods and systems for evaluation of images depicting items for sale online, to improve sales of the items, are provided. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Fashion (e.g., apparel) is a fast-growing category in online shopping. Because a user shopping in an online store may not have the same sensory experience as when shopping in a brick-and-mortar store, the use of images depicting the items (e.g., goods or services) for sale is very important. Images of items, especially of apparel goods for which their appearance matters to the buyers, play a key role in conveying crucial information about the goods that can be hard to express in text. Whether a user selects (e.g., clicks on) an image to visually examine the item illustrated in the image may influence whether the user purchases the item.

Because the visual representation of an item (e.g., an item of apparel) for sale may significantly impact the user's choices with respect to the particular item (e.g., the initial research, the decision to examine the image showing the item, the decision to mark the image for future reference, or the purchase decision), it may be beneficial to a seller to obtain an evaluation of the relative effectiveness of different types of images in showcasing the item for sale. An evaluation of an image depicting an item for sale online may facilitate a presentation of the item in an image in the best way such that the image serves as a persuasive tool that helps a seller of the item to sell the item. Furthermore, the evaluation of the image that depicts the item for sale may assist sellers in avoiding a possible mistaken conclusion on the part of potential buyers that the item is of poor quality simply based on the image of the item being of poor quality.

In some example embodiments, an image evaluation system may facilitate an image evaluation of an image depicting an item for sale. The image evaluation of the image, in some example embodiments, may be based on an image analysis of the image and on an analysis of user behavior in relation to (e.g., toward) images. According to certain example embodiments, the evaluation of an image may include an examination of the image based on a number of image attributes (e.g., a display type for the item, professional photography, lighting, atmosphere, image quality, or a suitable combination thereof), a classification of the image into one or more categories based on one or more image attributes, a comparison of the image to other images submitted by other sellers, and/or a determination of the likelihood of obtaining a desired response from a user (e.g., a potential buyer of the item) who sees the image. This evaluation may be based on a comparison of the image with images of other similar items in similar categories, as well as compared with images provided by other sellers.

The image evaluation may be used to provide feedback or recommendations to the provider of images (e.g., a seller of the items for sale) with respect to the images in order to increase the sales (e.g., improve the sale-through rate) of the items depicted in the images. The feedback may include statements such as: "Your image of the item is 80% better than the images uploaded by other sellers of the item;" "Your image of the item is better than the images provided by 40% of the sellers of this type of item;" "Your image of the item would improve if you used a model to display the item depicted in the image;" "Use better lighting;" "Use more contrast in the image;" or "Use a different filter."

According to various example embodiments, a recommendation may address improving the image in order to obtain a desired response from users (e.g., increase the click-through rate for the image or increase sales of the item). In some example embodiments, the image evaluation of an image submitted by (e.g., received from) a seller of an item depicted in the image is based on the results of an analysis of the image submitted by the seller and on the results of an analysis of data that describes user behavior in relation to images that depict items similar to the item (e.g., belonging to the same category of clothing) depicted in the image received from the seller. The data that describes user behavior in relation to images may include indicators of actions taken by users buyers) in response to seeing a plurality of images displayed to the users. The data that describes user behavior in relation to images (also called "user behavior data" or "user behavior indicators") may be captured (e.g., collected) based on the interaction of one or more users with numerous images that include a variety of display types and are of varied image quality (e.g., lighting, professional photographs, or a suitable combination thereof).

In some example embodiments, large scale user behavior data from a worldwide e-commerce platform may be used to evaluate the effect of different display types on people's shopping behaviors. Generally, in the context of online apparel selling, clothing may be displayed in three ways: on a human model, on a mannequin, or flat (e.g., with neither a mannequin nor a human model). Analyses of behavioral and transaction data (e.g., clicks, watches, bookmarks, or purchases) reveal that users are more drawn to clothing that is modeled by a human model than clothing displayed on a mannequin or in a flat form, even when other factors (e.g., the price, or the seller details) are accounted for. In some example embodiments, the image evaluation system predicts, based on modeling user preferences, the level of attention of the users to an image depicting an item (e.g., a clothing item). The image evaluation system may also determine the likelihood of purchase of the item based on the item presentation (e.g., one or more images depicting the item) submitted by the seller of the item. In some instances, the image evaluation system may recommend that a seller use a display type that is more effective in attracting buyers' attention to the item and that may increase the sell-through rate for the item.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. In various example embodiments, the marketplace applications 120 may include an image evaluator 132. The image evaluator 132, in some example embodiments, may facilitate an image evaluation of an image depicting an item for sale and a determination of the likelihood of obtaining a desired response from a user (e.g., a potential buyer of the item) who sees the image.

The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted b the third party. The third party website may, for example, provide one or more promotional, marketplace, or payment functions that are supported by the relevant applications of the networked system 102.

Figure 2:
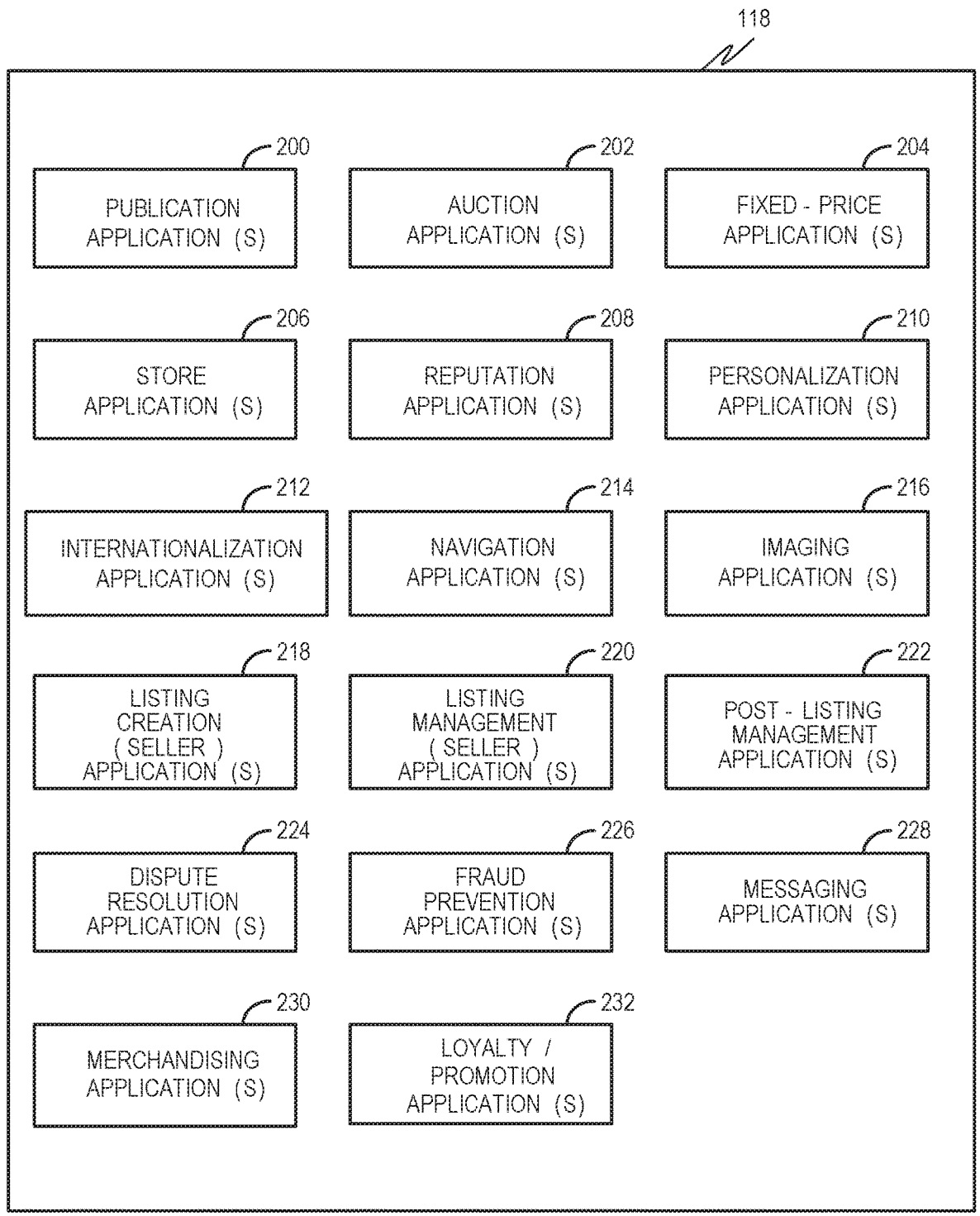
FIG. 2 is a block diagram illustrating marketplace and payment applications and that, in some example embodiments, are provided as part of application server(s) 118 in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
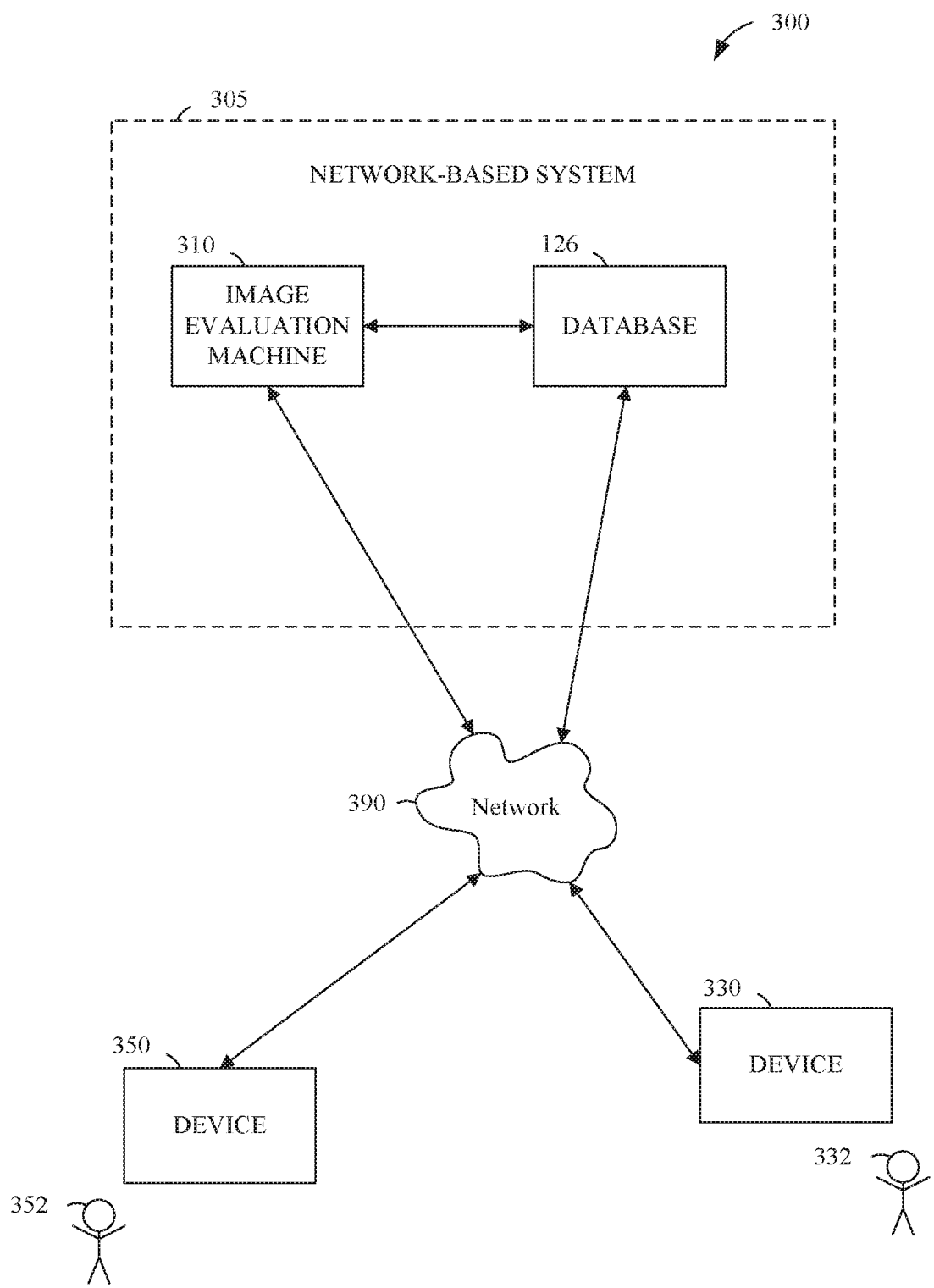
FIG. 3 is a network diagram illustrating a network environment suitable for image evaluation, according to some example embodiments.

FIG. 3 is a network diagram illustrating a network environment 300 suitable for image evaluation, according to some example embodiments. The network environment 300 includes an image evaluation machine 310 (e.g., the image evaluator 132), a database 126, and devices 330 and 350, all communicatively coupled to each other via a network 390. The image evaluation machine 310, with or without the database 126, may form all or part of a network-based system 305 (e.g., a cloud-based server system configured to provide one or more image processing services, image evaluation services, or both, to the devices 330 and 350). One or both of the devices 330 and 350 may include a camera that allows capture of an image (e.g., an image of an item for sale). One or both of the devices 330 and 350 may facilitate the communication of the image (e.g., as a submission to the database 126) to the image evaluation machine 310. The image evaluation machine 310 and the devices 330 and 350 may each be implemented in a computer system, in whole or in part, as described below with respect to FIG. 16.

Also shown in FIG. 3 are users 332 and 352. One or both of the users 332 and 352 may be a human user (e.g., a human being), a machine user (e.g., a computer configured by a software program to interact with the device 330), or any suitable combination thereof (e.g., a human assisted by a machine or a machine supervised by a human). The user 332 is not part of the network environment 300, but is associated with the device 330 and may be a user of the device 330. For example, the device 330 may be a desktop computer, a vehicle computer, a tablet computer, a navigational device, a portable media device, a smartphone, or a wearable device (e.g., a smart watch or smart glasses) belonging to the user 332. Likewise, the user 352 is not part of the network environment 300, but is associated with the device 350. As an example, the device 350 may be a desktop computer, a vehicle computer, a tablet computer, a navigational device, a portable media device, a smartphone, or a wearable device (e.g., a smart watch or smart glasses) belonging to the user 352.

Any of the machines, databases, or devices shown in FIG. 3 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 16. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 3 may be combined into a single machine, and the functions described herein for any single machine, database, or device may be subdivided among multiple machines, databases, or devices.

Figure 4:
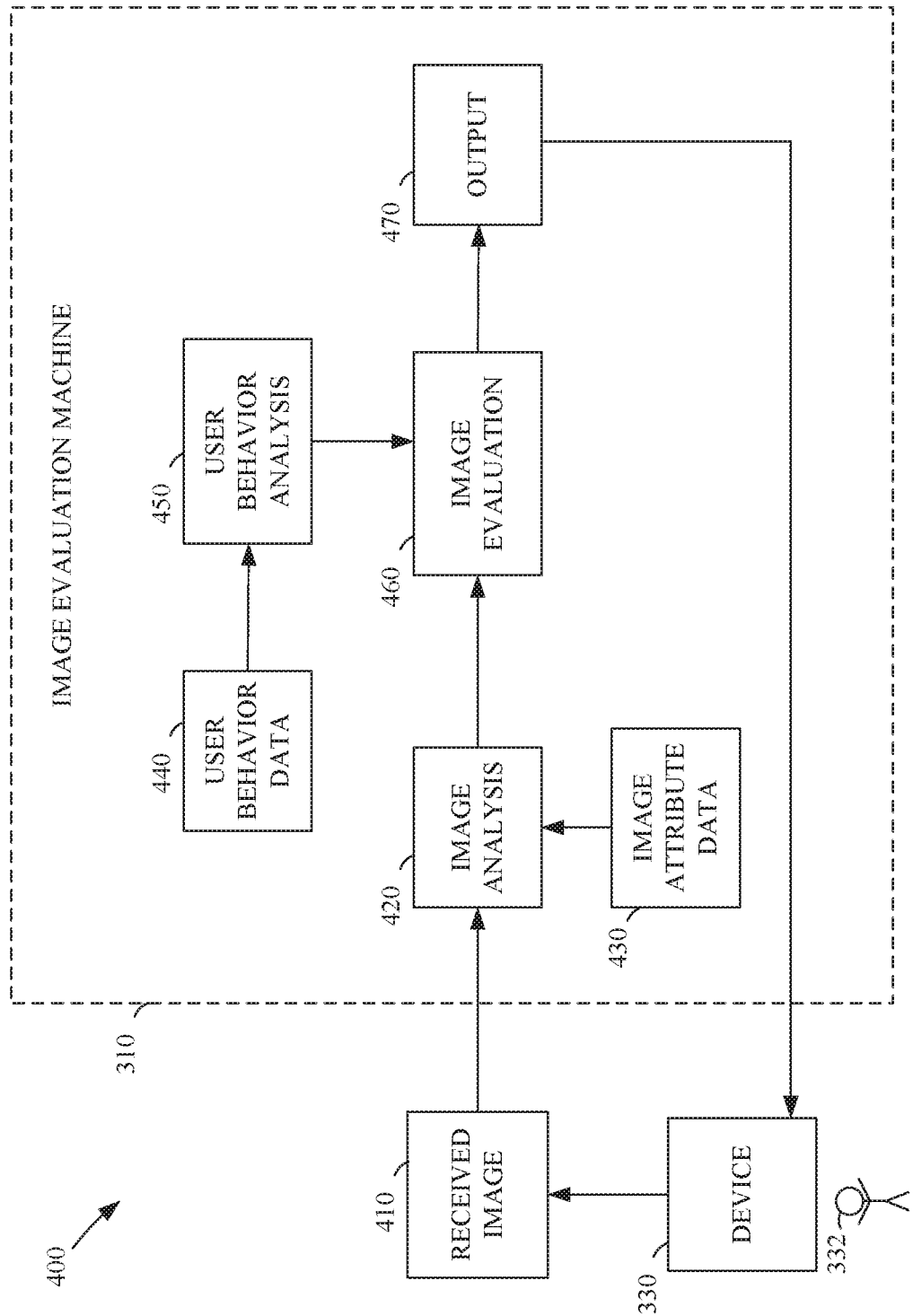
FIG. 4 is a functional diagram of an example image evaluation machine, according to some example embodiments.

The network 390 may be any network that enables communication between or among machines, databases, and devices (e.g., the server machine 310 and the device 330). Accordingly, the network 390 may be a wired network, a wireless network (e.g., a mobile or cellular network), or any suitable combination thereof. The network 390 may include one or more portions that constitute a private network, a public network (e.g., the Internet), or any suitable combination thereof. Accordingly, the network 390 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 390 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software, FIG. 4 is a functional diagram of an example image evaluation machine 310, according to some example embodiments. In some example embodiments, the image evaluation machine 310 is included in a network-based system 400. As described in more detail below, the image evaluation machine 310 may receive an image 410 (e.g., an image of a clothing item). The received image 410 (also "image 410") may be received from the device 330 associated with the user 332.

In response to receiving the image 410, the image evaluation machine 310 analyses (e.g., performs an image analysis 420 of) the image using at least one computer processor. In some example embodiments, to perform the image analysis 420, the image evaluation machine 310 extracts one or more visual features from the received image 410. The image evaluation machine 310 may also identify the value(s) of one or more image attributes of the received image 410 based on the extracted one or more visual features of the received image 410 and the image attribute data 430 (e.g., data that identifies or describes image attributes and the values the image attributes may take). The image evaluation machine 310 may also classify the received image 410 into one or more categories based on the value(s) of the one or more image attributes 430.

For example, the one or more visual features extracted from the received image 410 may include data that indicates a display type (e.g., a human person, a mannequin, or a flat display) used to display the clothing item depicted in the received image 410. The image attribute data 430 may include a number of image attributes, such as a display type, background, contrast, or lighting. Each image attribute 430 may be associated with (e.g., take, or have a corresponding) one or more values. For instance, the display type attribute may take one of three values: (1) person, (2) mannequin, or (3) flat. Based on the one or more visual features extracted from the received image 410 and the display type attribute, the image evaluation machine 310 may identify the value of the display attribute of the received image 410 (e.g., person). The image evaluation machine 310 may classify the received image 410 into a specific display type category (e.g., the person category, the mannequin category, or the flat category) based on the identified value of the display type attribute of the received image 410.

In some example embodiments, instead of or in addition to classifying the received image 410 into a category based on the display type attribute value of the received image 410, the image evaluation machine 310 assigns (e.g., attributes) a label (e.g., a tag) to the received image 410 that identifies the display type used to display the item depicted in the image. The image evaluation machine 310 may also compute a confidence score value for the received image 410 to indicate a level of certainty of the correct determination of the display type of the received image 410. The label or the confidence score value, or both, may be stored in a record of a database (e.g., the database 126) in association with the received image 410, and may be used in further image evaluation of the received image 410.

According to certain example embodiments, one or more image attributes and their values (e.g., one or more attribute-value pairs) serve as basis for computing an image score value for an image. For example, for a particular image of a black dress the value of the attribute "display type" is identified to be "person", the value of the attribute "lighting" is determined to be "good", and the value of the attribute "background" is determined to be "white." Based on these attribute-value pairs, an image score value may be determined for the particular image of the black dress. Other attributes, such as contrast, clarity, arrangement, composition, or balance, or a suitable combination of attributes, may also serve as basis for computing the image score value of an image that depicts an item.

In some example embodiments, the image score value of an image may be based on a confidence score value of the image and a low-level-quality score value of the image. The image evaluation machine 310 may determine a confidence score attributable to (e.g., for, of, or assigned to) the received image 410 that measures a level of certainty that the received image 410 is classified into a category to which the received image 410 belongs (e.g., an image that uses the "person" display type belongs to the person category). In certain example embodiments, the confidence score value of the received image 410 takes a value between 0 and 1. The higher the confidence score value, the higher the certainty level that the image evaluation machine 310 determined correctly the category into which to classify the received image 410. For example, the image evaluation machine 310 determines that an image A is of the "mannequin" display type with a confidence score value of 8. That may mean that there is an 80% certainty that the image evaluation machine 310 determined the display type of the image A correctly. The image evaluation machine 310 may determine a low-level-quality score value attributable to (e.g., for, of, or assigned to) the received image 410 based on one or more other image attributes (e.g., lighting, clarity, or professionally-generated) of the received image 410. In certain example embodiments, the confidence score value of the received image 410 and the low-level-quality score value of the received image 410 are combined to generate an image score value of the received image 410.

The confidence score value of the received image 410 and the low-level-quality score value of the received image 410 may be combined, in some instances, based on multiplying the confidence score value of the received image 410 and the low-level-quality score value of the received image 410 to compute the image score value of the received image 410. In other instances, the confidence score value of the received image 410 and the low-level-quality score value of the received image 410 may be assigned particular weights, according to a weight assigning rule, to generate a weighted confidence score value of the received image 410 and a weighted low-level-quality score value of the received image 410. The weighted confidence score value of the received image 410 and the weighted low-level-quality score value of the received image 410 may be added together to compute the image score value of the received image 410. In some example embodiments, the particular weights may be selected during the user behavior analysis 450 of user behavior data 440 that indicates how users, who see a plurality of images that depict similar items and have different image attribute values, act in relation to particular images.

In some example embodiments, the image evaluation machine 310 ranks the images included in a particular category of images (e.g., the images depicting clothing in the person category) or a sub-category of a particular category of images (e.g., the images depicting black dresses in the person category). The ranking may be based on the confidence score values of the images, the low-level-quality score values of the images, or the image score value that combines the confidence score value and the low-level-score value of the respective images. For example, the image evaluation machine 310 identifies the images included in the person category of images that depict clothing items displayed using human persons. The image evaluation machine 310 determines the confidence score values and the low-level-quality score values of the respective images in the person category. For each image in the person category, the image evaluation machine 310 may combine the confidence score value and the low-level-quality value that correspond to a particular image to generate the image score value that corresponds to the particular image. Upon computing the image score values for the images in the person category, the image evaluation machine 310 may rank the images within the person category based on their respective image score values. In some example embodiments, the images are presented to users (e.g., buyers) according to their image score value.

According to various example embodiments, the image evaluation machine 310 collects (e.g., captures, accesses, or receives) user behavior data 440 (e.g., indicators of actions taken by potential buyers, actual buyers, or a combination thereof, in relation to a plurality of images that depict clothing items of a particular type). In some example embodiments, the user behavior data 440 represents the behavior of one or more users searching for an item and responding to (e.g., selecting or not selecting, or viewing or not viewing) one or more images that depict the searched item and that are displayed to the one or more users. The user behavior data 440, in some example embodiments, is collected over a period of time. In other example embodiments, the user behavior data 440 is collected at one instance in time.

The image evaluation machine 310 may perform a user behavior analysis 450 based on the user behavior data 440 to learn (e.g., determine) what images are preferred by the users (e.g., buyers). In particular, the image evaluation machine 310 may determine what image attribute-value pairs may correlate to desirable user behavior (e.g., clicking on the image or purchasing the item depicted in the image).

For example, the user behavior data 440 may be collected from an e-commerce platform (e.g., an online marketplace, an online store, or a web site). The e-commerce platform may enable users to search for items for sale using a text query entered at a web site. In each search session, a user may input a query looking for a certain item and the search engine may return multiple search results that reference the items (e.g., images that depict the items). Searches may be very personalized tasks with huge variations in terms of search intention and product attributes. In order to focus only on apparel items and limit the images to similar content (e.g., the same category of product), the image evaluation machine 310 may limit the scope of user behavior data collected.

In some example embodiments, the image evaluation machine 310 may be configured to be a query-dependent machine. As a query-dependent machine, the image evaluation machine 310 may be configured to collect only descriptors of (e.g., data that describes) query sessions that use a specific keyword. For example, the image evaluation machine 310 may be configured to collect only descriptors of query sessions using the keyword "black dress." In another example, the image evaluation machine 310 may be configured to collect only descriptors of query sessions using the keyword "sweaters." By configuring the image evaluation machine 310 to be a query-dependent machine, the image evaluation machine 310 may limit the scope of user behavior data collected based on a specific query.

The image evaluation machine 310 may rank the search results referencing the items (e.g., the images depicting a black dress) based on their relevance to a particular keyword. In some example embodiments, when collecting the user behavior data 440, the image evaluation machine 310 may collect only data that describes user behavior in relation to images of highly relevant items. The highly relevant items may be the items depicted in images displayed on the first search results page in response to a query entered by a user.

Accordingly, the images that are part of the search results are likely to have the same content (e.g., a black dress). The images may only differ in their presentation (e.g., image attributes). For example, the images may differ in the display type of the black dress: on a human model, mannequin, or just flat. It may be beneficial to sellers to know how users behave in relation to images that have similar content but different image attributes.

The performing of the user behavior analysis 450 may indicate how users behave when presented with a number of images that have different image attributes. In some instances, the performing of the user behavior analysis 450 may facilitate a determination of whether the image is pleasant to buyers, whether the image is likely to help sell the item shown in the image, or whether the image is likely to be ignored by potential buyers of the item depicted in the image. In some example embodiments, the performing of the user behavior analysis 450 may include identifying specific user actions by one or more users in relation to one or more images that depict an item of clothing (e.g., a black dress) and that manifest the one or more users' interest toward the image or the item depicted in the image. A user's interest toward a particular image or the item depicted in the particular image may, in some instances, be implied based on the user's interaction with the particular image. The specific user actions may include, for example, selecting (e.g., clicking on) a particular image from a plurality of images displayed to the user, bookmarking the particular image for later reference, emailing the image, printing the image, viewing the image for a time exceeding a threshold period of time, or purchasing the item depicted in the image within another threshold period of time after viewing the image. The performing of the user behavior analysis 450 may also include identifying one or more attributes of the one or more images that depict the item of clothing and determining whether the one or more attributes correlate to an increased number of interest-manifesting activities by the one or more users to the one or more images.

In some example embodiments, the user behavior analysis 450 may focus on answering the following questions with respect to the display type attribute: (1) Do the three styles (e.g., person, mannequin, or flat) differ in their likelihood of being clicked on a search results page? (2) Do the three styles differ by motivating users to bookmark or "watch" the item? (3) Do the three styles differ in increasing the sell-through rate? (4) Quantitatively, how much difference is there between user preferences for these three styles? Other or additional questions may be used when examining the influence of other image attributes on user shopping behavior.

For a successful transaction, it may be crucial to attract the attention of potential consumers. User interest may be shown at different stages during the process of online shopping (e.g. browsing, click action, or purchase). A user-choice model for quantifying user preferences between the person-, mannequin-, and flat-display styles (also called the "PMF-user choice model" or the "PMF model") may facilitate the understanding and the quantifying of user responses at three stages during the online purchasing circle: (a) a "Click" action at the search result page, where multiple relevant items may be displayed according to the search query; (b) a "Watch" action at the view item page, where shoppers may evaluate the item in greater detail and may make decisions to either put the item on hold (e.g., by watching), to continue to browse, or to purchase the item; or (c) a "Purchase" action where the user makes a final decision on the product.

TABLE 1

Distribution shift for displayed, clicked, and unclicked items. For clicked items, the proportion of P-type increases while the proportions of M-type and F-type decrease indicating users favor P-type over M-type or F-type.

| Type | Displayed Items | Clicked Items | Unclicked Items |
| --- | --- | --- | --- |
| Flat | 40.87% | 39.21% | 40.99% |
| Mannequin | 34.49% | 33.26% | 34.57% |
| Person | 24.65% | 27.53% | 24.44% |

Given multiple relevant items displayed on the search result page, a user click response at the search result page may be identified (e.g., by the image evaluation machine 310). By categorizing image content into PMF types, Table 1 above shows a significant distribution shift from the original displayed search result to what were clicked by the users. The ratio of Person-type (also "P-type") is only 24.65% for displayed items, but increases to 27.53% for clicked items. Proportions decrease for both Mannequin-type (also "M-type") and Flat-type (also "F-type") for the clicked items. This distribution indicates that users favor P-type displays over M-type or F-type. Buyers show a strong inclination toward items presented in P-type even for different price segments or seller type.

Given higher attention drawn by P-type on the search result page, the image evaluation machine 310 may identify user actions on the view item page. The view item page may be a page where buyers may obtain details about the item depicted in the image and may engage in other interest-manifesting actions (e.g., bookmark the item for a more serious evaluation) indicating more direct shopping intention. The image evaluation machine 310 may compute the average watch count for each PMF type and for each seller group. The results shown in Table 2 below suggest a positive correlation of the "watch action" with top seller as well as P-type product presentation. For items sold by either casual or top seller, a P-type image helps increase the chance of being watched. The proportion of P-type images goes up for highly watched items as compared to less watched items.

TABLE 2

Average "Watch Count" for each display type with respect to seller types. Results suggest P-type is correlated with higher average watch rate for both casual and top seller.

| | Avg-Watch | |
| Type | Casual-Seller | Top-seller |
| --- | --- | --- |
| Flat | 1.48 | 1.89 |
| Mannequin | 1.89 | 2.32 |
| Person | 2.73 | 3.32 |

The sell-through rate may be the ultimate evaluation metric for an online listing. Table 3 lists the conversion rate of each display type grouped by click action observed in the collected session data. Compared to unclicked items, clicked items show higher conversion rate, which may be expected because users show interest in the item through clicking on an image that depicts the item, which may lead to a higher chance of purchase. A comparison of the three display types (e.g., person, mannequin, and flat) may show that the items displayed in P-type demonstrate a better sell-through rate for either clicked or unclicked items.

TABLE 3

Conversion Rate for three display types for clicked and unclicked items in the collected session data, where items displayed by P-type show better sell-through rate.

| | Clicked Items | Unclicked Items |
| --- | --- | --- |
| Flat | 41.88% | 26.05% |
| Mannequin | 42.45% | 23.46% |
| Person | 47.94% | 28.23% |

The image evaluation machine 310 may also use the PMF-user choice model to determine the difference between the preferences for each display style and to quantitatively compare them. In the PMF-user choice model, $W_i \subset f, m, p$ may denote the level of preference toward each type, $F_i \subset f, m, p$ may be the proportions of each type in the original set of retrieved items where $F_f + F_m + F_p = 1$, and $P_i \subset f, m, p$ may be the proportion of each type among the clicked items. The smaller the proportion $F_i$ is, the harder it shows up in search result and picked by user. The higher preference $W_i$ is, the more likely this given type may be selected. Thus, $P_i$ is affected by both factors: distribution bias represented by $F_i$ and preference bias $W_i$.

Different approaches to merging these two factors, to obtain a reasonable prediction of a user preference level, may exist. In some example embodiments, only two choices are weighed, and it may be assumed that the ratio of the difficulty in the selecting given type is inversely proportional to the ratio of their post-click-distributions, where the difficulty is modeled by both $F_i$ and $W_i$. It also may be assumed that given equal preference (e.g., $W_f = W_m = W_p$) there should be no significant shift from before-click-distribution to post-click-distribution. In other words, it may be expected that $F_i = P_i$. Based on this idea, a PMF User Choice model one (C1) may be proposed:

$$\frac{\frac{1}{F_i} + \frac{1}{W_i} - \frac{1}{3} \times \sum_{t \subset f,m,p} \frac{1}{W_t}}{\frac{1}{F_j} + \frac{1}{W_j} - \frac{1}{3} \times \sum_{t \subset f,m,p} \frac{1}{W_t}} = \frac{P_j}{P_i} \quad (1)$$

where $$\frac{1}{W_i} - \frac{1}{3} \times \sum_{t \subset f,m,p} \frac{1}{W_t} = 0$$

when the level of all three types are identical, resulting in the same PMF distributions for both before-click and post-click data. Given the same constraint, another model may be to use multiplication instead, which leads to model two (C2):

$$\frac{\frac{1}{F_i} \times \frac{1}{W_i}}{\frac{1}{F_j} \times \frac{1}{W_j}} = \frac{P_j}{P_i} \quad (2)$$

The solution to both models is a set of pair-wise relations between preference levels, where $W_f$ and $W_m$ are parametrized as a function of $W_p$. By taking input from Table 1, i.e. assign $F_f = 0.4087$, $F_m = 0.3449$ and $F_p = 0.2465$ as before-click-distribution, and $P_f = 0.3921$, $P_m = 0.3326$ and $P_p = 0.2753$ as post-click-distribution, model C1 generates:

$$W_m^{C1} = \frac{W_p}{0.51789 \times W_p + 1} \quad (3)$$

$$W_f^{C1} = \frac{W_p}{0.50304 \times W_p + 1}$$

The result of model C2 shows directly that preference of M-type is about 86.3% of the preference to P-type:

$$W_m^{C2} = 0.863 \times W_p$$

$$W_f^{C2} = 0.859 \times W_p \quad (4)$$

Table 4 lists predicted preference level from both models, subject to sum-to-one, in accordance with an example embodiment. The P-type gains the highest preference, whereas no significant difference is found between M-type and F-type. There are two possible reasons. First, the Flat category consists of many non-dress items, which are retrieved when user uses queries like "black dress shoes." E-shoppers may tend to click those items either because they are exploring, or searching for coordinate items (e.g., shoes or belts) that match well with a black dress. Second, because Mannequin is an inanimate human-size figure, it is not as pleasant-looking to viewers as an actual human being.

TABLE 4

Estimated preference level of each PMF type by two proposed PMF User Choice models, where M or F-type is about 86% of P-type.

| Type | C1 | C2 |
|---|---|---|
| Flat | 0.3147 | 0.3155 |
| Mannequin | 0.3133 | 0.3171 |
| Person | 0.3740 | 0.3673 |

The results of the user behavior analysis 450 described above may show that, in some example embodiments, the P-type display of clothing in images may be the most effective product presentation among the three display types, and may help the most to attract users' attention and raise the sell-through rate. The results of the user behavior analysis 450 may be useful to numerous recipients, for example, to apparel e-retailers in choosing a better presentation strategy or to e-commerce operators in designing a better search or feed recommendation system to improve click-through rates. Furthermore, in some example embodiments, the user behavior analysis 450 may be used to evaluate an image that depicts an item to determine the likelihood of the image to elicit a desired response from a potential buyer of the item.

For example, the user behavior analysis 450 and the image analysis 420 may be used to perform an image evaluation 460 of the received image 410 received from the device 130 of the user 132 (e.g., a seller). In some example embodiments, the image evaluation machine 310 may compute, based on the results of the image analysis 420 and the results of the user behavior analysis 450, the likelihood of an average buyer engaging in an interest-manifesting action in relation to (e.g., towards) the received image 410 or the item depicted in the received image 410. Examples of interest-manifesting action in relation the received image 410 or the item illustrated in the received image 410 are selecting (e.g., clicking on) the received image 410 depicting the item or purchasing the item upon viewing the received image 410. According to certain example embodiments, the image evaluation machine 310 determines an image score value for the received image 410 that may indicate to the user 132 how an average buyer may respond to the received image 410 (e.g., what the likelihood of the buyer clicking on the received image 410 is or what the likelihood of the buyer purchasing the item depicted in the image is).

According to some example embodiments, upon performing the image evaluation 460, the image evaluation machine 310 may generate an output 470 that may be communicated to the user 132 via the device 130. Examples of the output 470 include a report of the results of the image evaluation 460, feedback based on the results of the image evaluation 460, or a recommendation how to improve the presentation (e.g., the display) of the item included in the received image 410. The output 470 may, in some instances, include the image score value for the received image 410, a ranking of the received image 410 as compared to other images (e.g., within a category of images or regardless of the category of images) provided by other sellers, or an indication of the likelihood of selling the item depicted in the received image 410 if using the received image 410 as a representation of the item on an e-commerce site.

In some example embodiments, the output 470 includes a suggestion on how to select a cost-effective display type based on the results of the image analysis 420, the image evaluation 460, or both. For example, the output 470 may include the image score value for the received image 410 or the ranking of the received image 410 as compared to other images (e.g., within a category of images or regardless of the category of images) provided by other sellers, and may provide one or more options to improve the display of the item using images that depicts the item based on the image score value, the ranking value (e.g., position, order, or score), or both. In some instances, one of the options may be to choose a different type of display (e.g., choose M-type over F-type, or P-type over M-type) where the change of display type is cost-effective. In other instances, where the cost of changing the display type is high, the suggested option may be to improve other attributes of the image (e.g., lighting, professional photography, or an uncluttered or white background).

Figure 5:
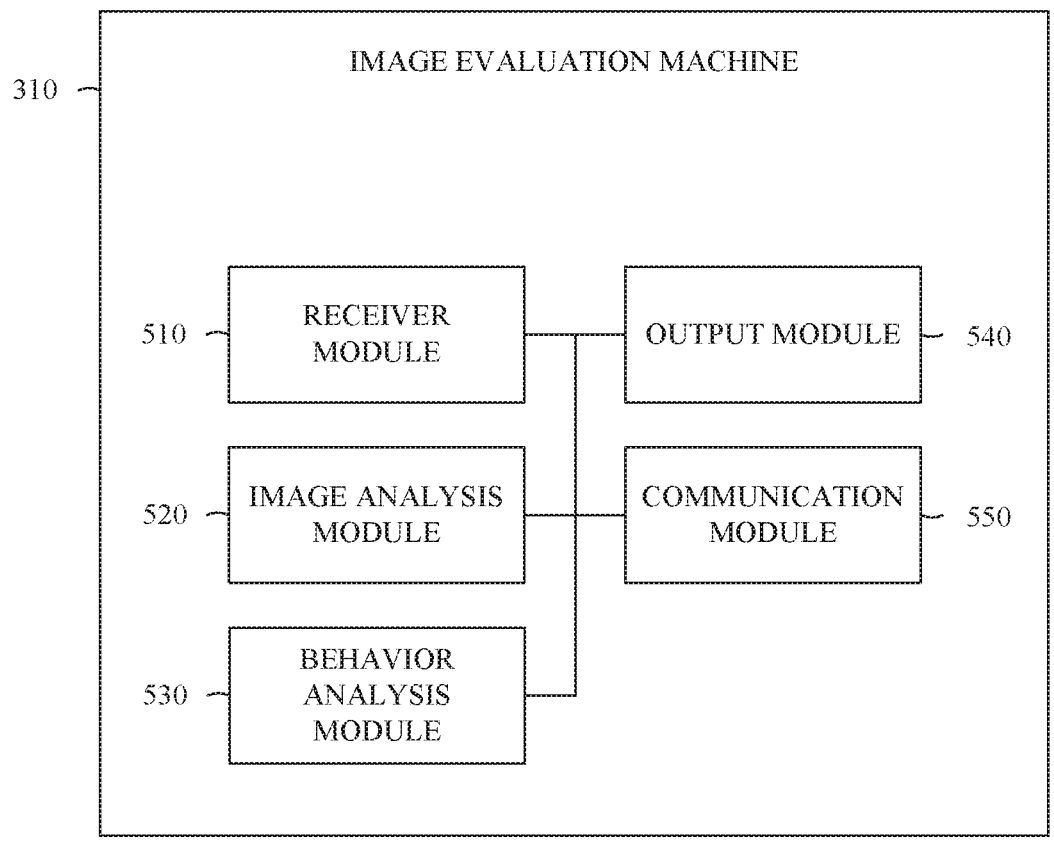
FIG. 5 is a block diagram illustrating components of the image evaluation machine, according to some example embodiments.

FIG. 5 is a block diagram illustrating components of the image evaluation machine 310, according to some example embodiments. The image evaluation machine 310 is shown as including a receiver module 510, an image analysis module 520, a behavior analysis module 530, an output module 540, and a communication module 550, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
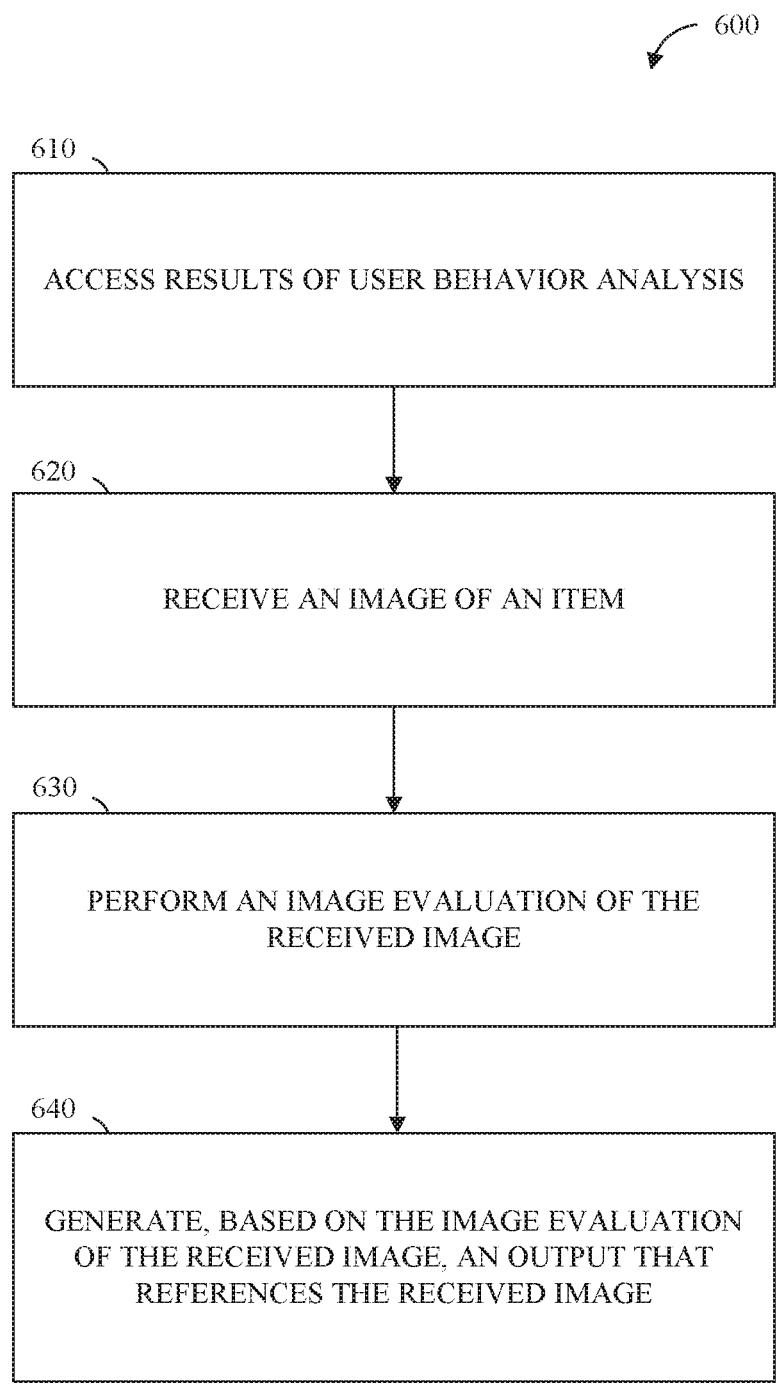
FIGS. 6-14 are flowcharts illustrating operations of the image evaluation machine in performing a method of evaluating one or more images, according to some example embodiments.

FIGS. 6-14 are flowcharts illustrating operations of the image evaluation machine 310 in performing a method 600 of evaluating one or more images, according to some example embodiments. Operations in the method 600 may be performed using modules described above with respect to FIG. 5. As shown in FIG. 6, the method 600 may include one or more of operations 610, 620, 630, and 640.

Image evaluation by the image evaluation machine 310 may begin, at method operation 610, with the receiver module 510 accessing one or more results of a user behavior analysis. The results of the user behavior analysis may be generated by the behavior analysis module 530 based on analyzing the user behavior data 440. The user behavior data 440 may relate to a plurality of test images. The user behavior data 440 may be collected based on user behavior of one or more users (e.g., potential buyers of actual buyers) relation to the plurality of test images. The analysis of the user behavior data 440 may include determining user preferences of the one or more users for particular value(s) of one or more image attributes of a plurality of images (e.g., images included in a library of test images) displayed to the plurality of users.

At method operation 620, the receiver module 510 receives an image of an item. The image may be received from a user device (e.g., a smartphone) of a user (e.g., a seller). The image, in some example embodiments, may depict an item of clothing.

At method operation 630, the image analysis module 520 performs, using one or more processors, an image evaluation of the image. The performing of the image evaluation of the image may include performing an image analysis of the image and evaluating the image based on the image analysis of the image. The evaluating of the image may be based on a result of the image analysis and a result of the user behavior analysis accessed by the receiver module 510. In some example embodiments, the evaluating of the image includes determining a likelihood of obtaining a desired response from one or more buyers to whom the image may be displayed.

At method operation 640, the output module 540 generates an output that references (e.g., includes a reference to, identifies using an identifier (ID), etc.) the image. The output may be generated based on the image evaluation of the image. The output may be generated for the user device in response to receiving the image of the item from the user device.

In some example embodiments, the method 600 may further comprise transmitting a communication to the device of the seller (e.g., by the communication module 550). The communication may include the generated output that references the image. Further details with respect to the method operations of the method 600 are described below with respect to FIGS. 6A-14.

Figure 6A:
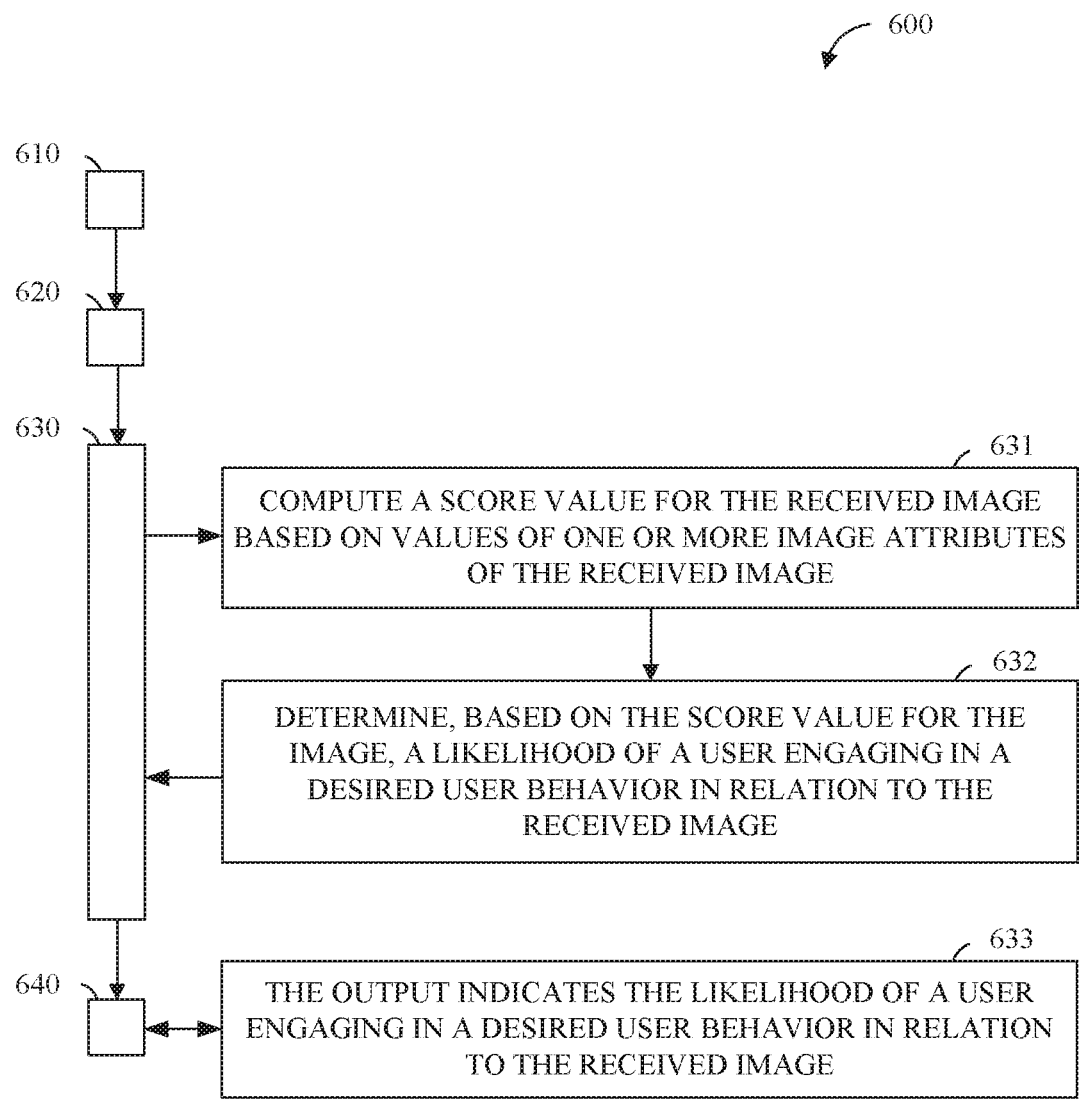

As shown in FIG. 6A, the method 600 may include one or more of method operations 631, 632, and 633, according to some example embodiments. Method operation 631 may be performed as part (e.g., a precursor task, a subroutine, or a portion) of the method operation 630, in which the output module 540 generates an output that references the image. At method operation 631, the image analysis module 520 computes a score value for the received image. The computing of the score value for the image may be based on the values of the one or more image attributes of the image.

Method operation 632 may be performed after method operation 631. At method operation 632, the image analysis module 520 determines a likelihood of a different user (e.g., a buyer) engaging in a desired user behavior in relation to (e.g., toward) the received image. Examples of desired user behavior in relation to the received image are selecting, clicking on, or marking for future reference the received image; purchasing the item depicted in the received image or placing the respective item on a wish list; etc. In some instances, the received image may be received from a seller of the item depicted in the received image, from an agent of the seller, or from a user device of the seller or of the agent of the seller. In some example embodiments, the determining of the likelihood of the different user engaging in a desired user behavior in relation to the received image may be based on the score value of the received image. In various example embodiments, the determining of the likelihood of the different user engaging in a desired user behavior in relation to the received image may be based on the one or more results of the analysis of the user behavior data. In certain example embodiments, the determining of the likelihood of the different user engaging in a desired user behavior in relation to the received image may be based on the score value of the received image and on the one or more results of the analysis of the user behavior data.

Method operation 633 may be performed as part (e.g., a precursor task, a subroutine, or a portion) of method operation 640, in which the output module 540 generates an output that references the image. At method operation 633, the output module 540 generates an output that references the image and indicates the likelihood of the user engaging in a desired user behavior in relation to the received image.

Figure 6B:
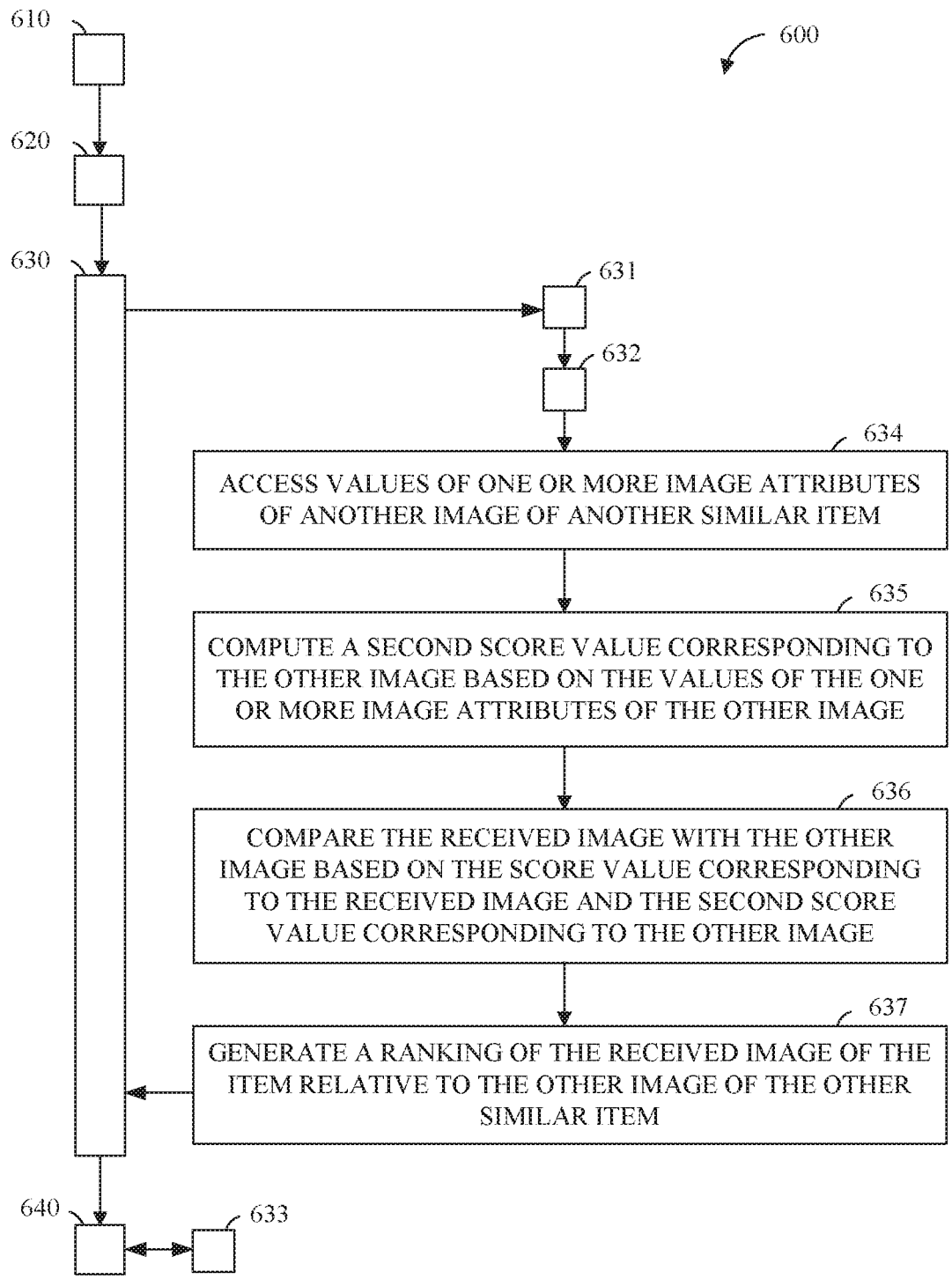

As shown in FIG. 6B, the method 600 may include one or more of method operations 634, 634, 636, and 637, according to some example embodiments. Method operation 634 may be performed after method operation 632, in which the image analysis module 520 determines a likelihood of a user (e.g., a generic buyer, a specific buyer, etc) engaging in a desired user behavior in relation to the received image. At method operation 634, the image analysis module 520 accesses value(s) of one or more image attributed of another (e.g., a second) image of another similar item. The item depicted in the image and the other similar item depicted in the other image may have similar characteristics, such as style, color, pattern, etc. For example, both the item and the other similar item may be little black dresses.

Method operation 635 may be performed after method operation 634. At method operation 635, image analysis module 520 computes a second score value corresponding to the other image. The computing of the second score value may be based on the values of the one or more image attributes of the other image.

Method operation 636 may be performed after method operation 635. At method operation 636, image analysis module 520 compares the image with the other image based on the score value (e.g., a first score value) corresponding to the image and the second score value corresponding to the other image.

Method operation 637 may be performed after method operation 636. At method operation 637, image analysis module 520 generates a ranking of the image of the item relative to the other image of the other similar item.

Figure 7:
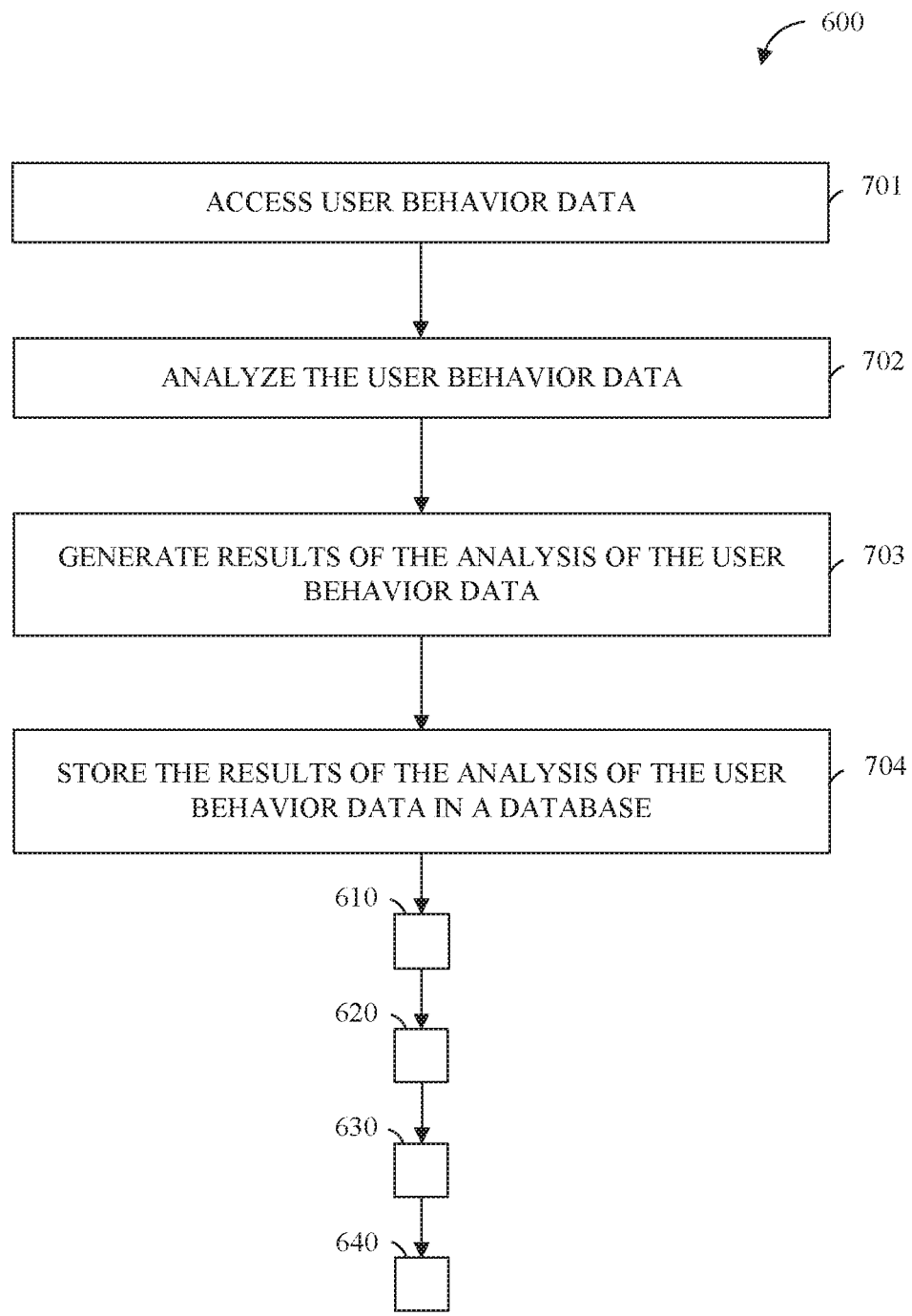

As shown in FIG. 7, the method 600 may include one or more of method operations 701, 702, 703, and 704, according to some example embodiments. Method operation 701 may be performed before the method operation 610, in which the receiver module 510 accesses one or more results of a user behavior analysis. At method operation 701, the behavior analysis module 530 accesses (e.g., receives) user behavior data. The user behavior data may be indicators of actions taken by users (e.g., actual or potential buyers) in response to receiving a number of images that depict one or more similar items, indicators of lack of action taken by the users, or a combination thereof.

Method operation 702 may be performed before the method operation 610, in which the receiver module 510 accesses one or more results of a user behavior analysis. At method operation 702, the behavior analysis module 530 analyzes the user behavior data, as described above with respect to FIG. 2.

Method operation 703 may be performed before the method operation 610, in which the receiver module 510 accesses one or more results of a user behavior analysis. At method operation 703, the behavior analysis module 530 generates one or more results of the analysis of the user behavior data. In some example embodiments, the one or more results of the analysis of the user behavior data includes one or more indicators of user preferences for particular images of particular image attributes. For example, an indicator of user preferences indicates that users (e.g., apparel buyers) generally prefer images that use the person display type to display clothing items. According to another example, an indicator of user preferences indicates that, with images that use the mannequin display type, a majority of users prefer images that have a white background. The users' preferences for particular images may be implied based on user actions toward particular images, such as selecting (e.g., clicking on) the particular images or marking the image for future reference. In some instances, the users' preferences for the particular images may be implied based on the users purchasing the items depicted in the particular images.

Method operation 704 may be performed before the method operation 610, in which the receiver module 510 accesses one or more results of a user behavior analysis. At method operation 704, the behavior analysis module 530 stores the results of the analysis of the user behavior data in a database (e.g., the database 126).

Figure 8:
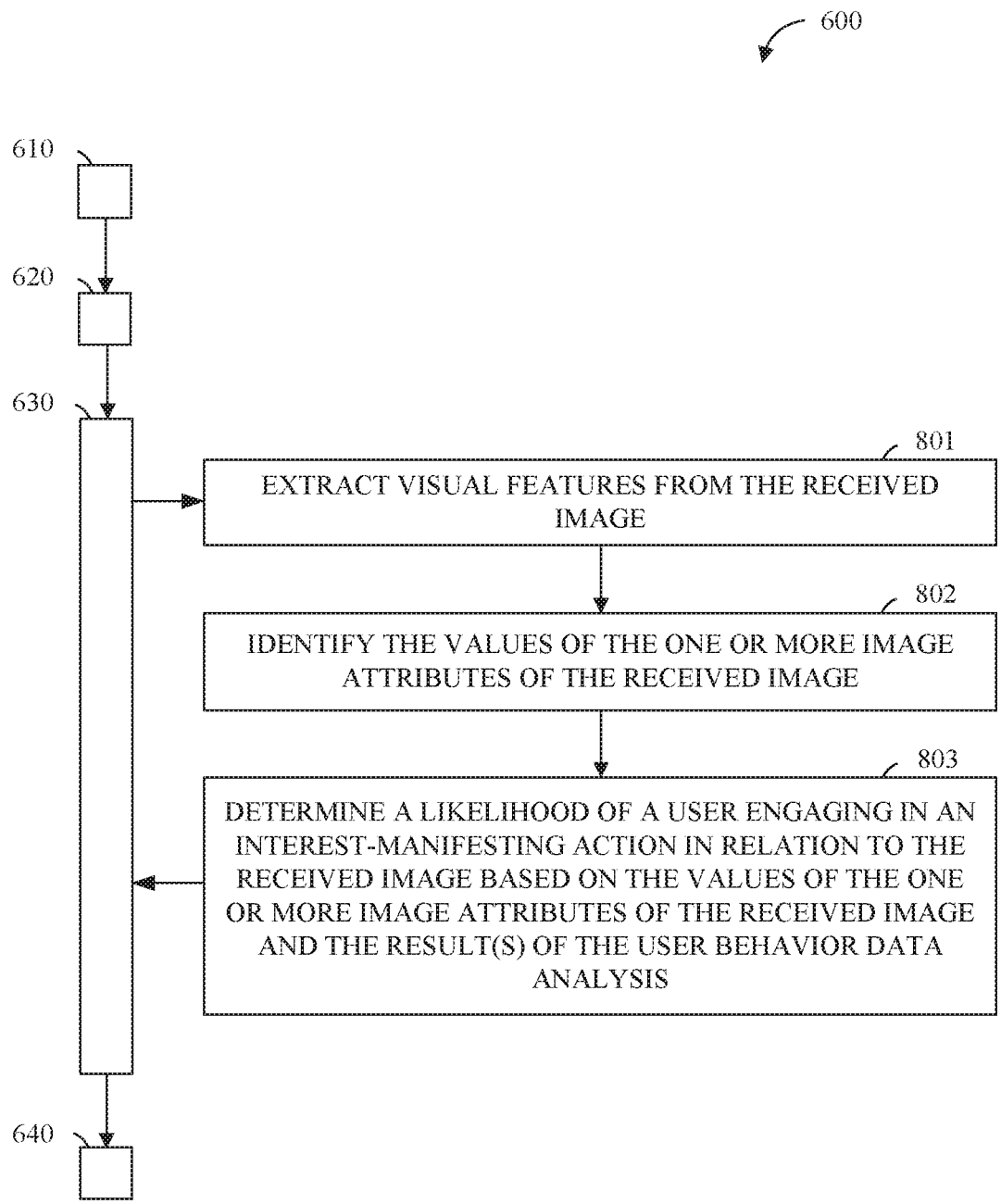

As shown in FIG. 8, the method 600 may include one or more of method operations 801, 802, and 803, according to some example embodiments. Method operation 801 may be performed as part (e.g., a precursor task, a subroutine, or a portion) of method operation 630, in which the image analysis module 520 performs an image evaluation of the image. At method operation 801, the image analysis module 520 extracts one or more visual features from the image received from the seller.

Method operation 802 may be performed after method operation 801. At method operation 802, the image analysis module 520 identifies the values of the one or more image attributes of the image (e.g., the value of a display type used to display the item within the image). The identifying of the display type used to display the item within the image may be based on the one or more visual features extracted from the image received from the seller. In some example embodiments, the method operations 801 and 802 are performed as part of the image analysis 420 discussed above with respect to FIG. 4.

Method operation 803 may be performed after method operation 802. At method operation 803, the image analysis module 520 determines a likelihood of a user (e.g., a buyer), who sees the image, engaging in an interest-manifesting action in relation to the image (e.g., clicking on the image or purchasing the item depicted in the image). The determining of the likelihood of the buyer, who sees the image, engaging in an interest-manifesting action in relation to the image, may be based on the image analysis (or a result of the image analysis, e.g., the values of the one or more image attributes of the image, such as the identified value of display type of the image) and the user behavior data (e.g., a result of user behavior analysis). According to some example embodiments, the user behavior data includes data that identifies interactions by potential buyers of the item with one or more images illustrating the item. The buyer behavior data may indicate, in various example embodiments, a preference by the potential buyers in selecting images of a particular display type of a plurality of display types. Examples of interest-manifesting actions or interactions with images are selecting or clicking the image, viewing the image, placing the item depicted in the image on a wish list, pinning the image, or purchasing the item depicted in the image.

Figure 9:
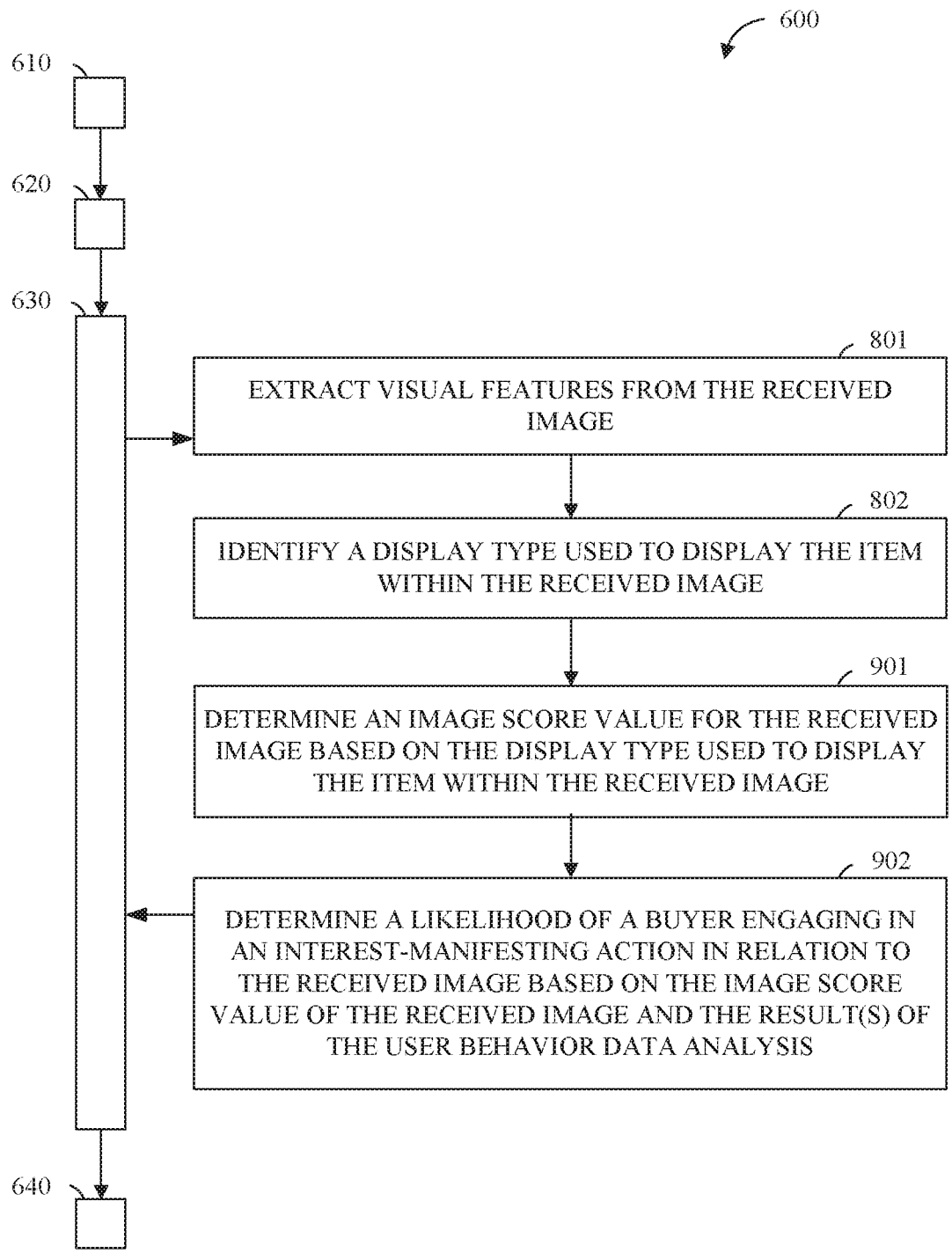

As shown in FIG. 9, the method 600 may include one or more of method operations 801, 802, 901, and 902, according to some example embodiments. Method operation 801, as described with respect to FIG. 8, may be performed as part (e.g., a precursor task, a subroutine, or a portion) of method operation 630, in which the image analysis module 520 performs an image evaluation of the image. At method operation 801, the image analysis module 520 extracts one or more visual features from the image received from the seller.

Method operation 802, as described with respect to FIG. 8, may be performed after the method operation 801. At method operation 802, the image analysis module 520 identifies a display type used to display the item within the image. The identifying of the display type used to display the item within the image may be based on the one or more visual features extracted from the image received from the seller. In some example embodiments, the method operations 801 and 802 are performed as part of the image analysis 420 discussed above with respect to FIG. 4.

Method operation 901 may be performed after method operation 802. At method operation 901, the image analysis module 520 determines an image score value for the image. The image score value for the image may be determined based on the display type used to display the item within the image.

Method operation 902 may be performed after the method operation 901. At method operation 902, the image analysis module 520 determines a likelihood of a buyer, who sees the image, engaging in an interest-manifesting action in relation to (e.g., clicking on) the image. The determining of the likelihood of the buyer, who sees the image, engaging in an interest-manifesting action in relation to the image, may be based on the image analysis (or a result of the image analysis, e.g., the image score value of the image) and the user behavior data (e.g., a result of user behavior analysis).

Figure 10:
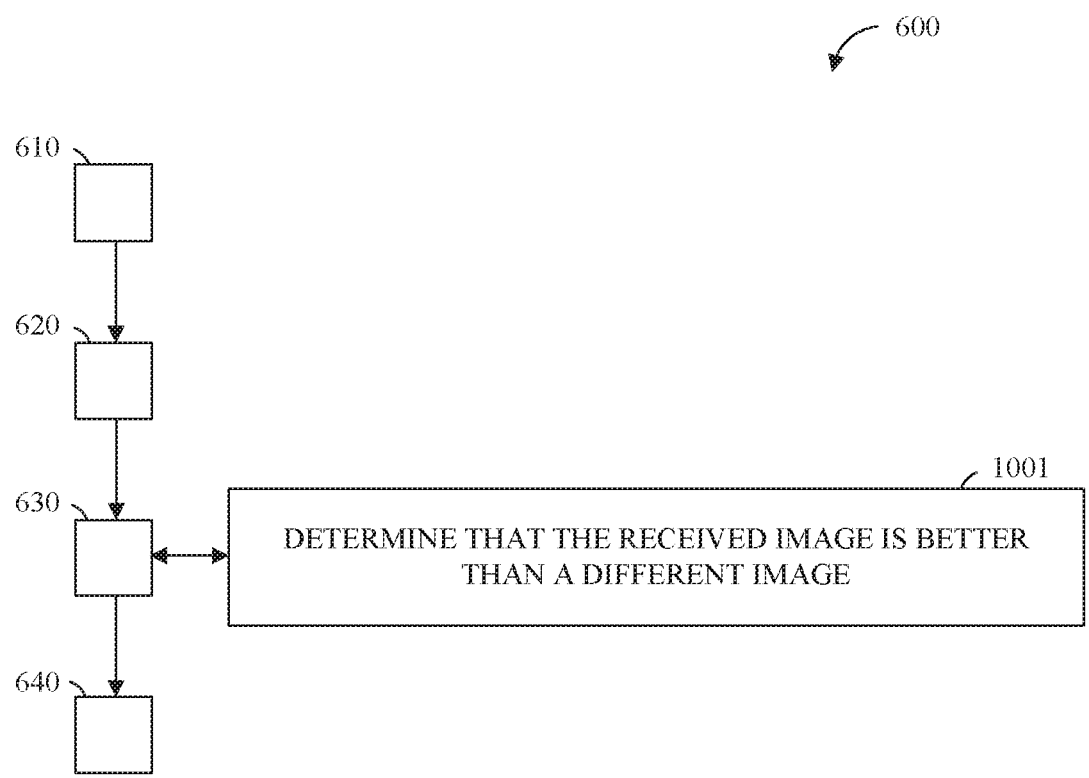

As shown in FIG. 10, the method 600 may include method operation 1001. Method operation 1001 may be performed as part (e.g., a precursor task, a subroutine, or a portion) of method operation 630, in which the image analysis module 520 performs an image evaluation of the image. At method operation 1001, the image analysis module 520 determines that the image is better than a different image. The determining that the image is better than a different image may be based on a comparison of the image (e.g., a first image received from a first seller) and a different image (e.g., a second image received from the first seller or a second image received from a different seller).

In certain example embodiments, to compare the image and a different image, the image analysis module 520, using one or more attribute comparison rules, performs a comparison of one or more image attributes-value pairs of the image and one or more corresponding image attributes-value pairs of the different image. For example, the image analysis module 520 may identify the respective values of the "clarity" attribute of a first image and of a second image. Based on applying an attribute comparison rule that specifies which attribute value corresponding to the "clarity" attribute ranks higher, the image analysis module 520 may determine which of the first and second images has a higher ranking value for the "clarity" attribute. Accordingly, the image analysis module 520 may identify the image that has the higher ranking value for the "clarity" attribute as the better image.

According to a different example, the image analysis module 520 may identify the respective values of the "display type" attribute of a first image and of a second image. Based on applying an attribute comparison rule that specifies which attribute value corresponding to the "display type" attribute ranks higher, the image analysis module 520 may determine which of the first and second images has a higher ranking value for the "display type" attribute. The attribute comparison rule that specifies which attribute value (e.g., "person", "mannequin", or "flat") corresponding to the "display type" attribute ranks higher (e.g., "person" ranks higher than "mannequin" or "mannequin" ranks higher than "flat") may be generated during the analysis of the user behavior data. Accordingly, the image analysis module 520 may identify the image that has the higher ranking value for the "display type" attribute as the better image.

Figure 11:
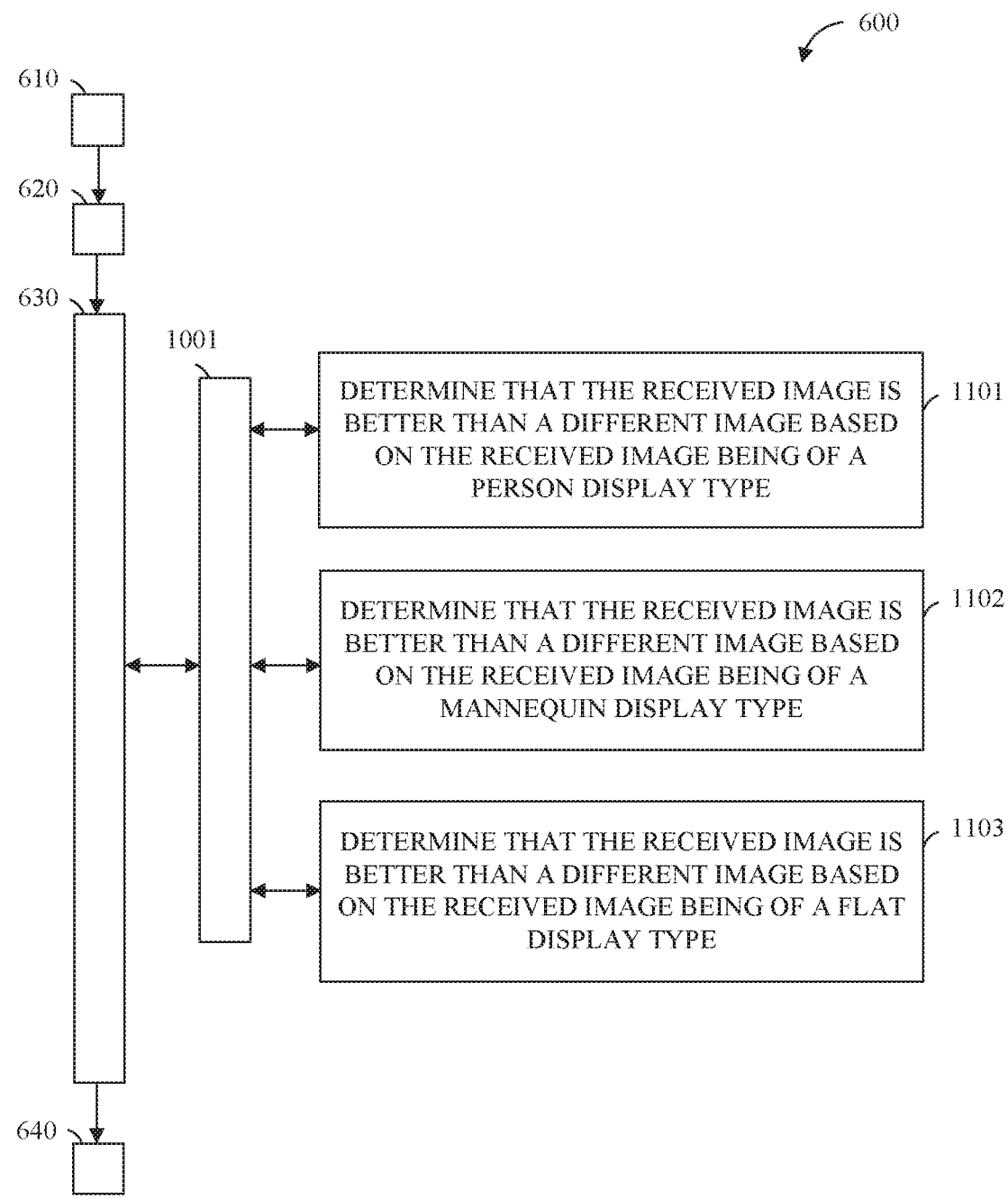

As shown in FIG. 11, the method 600 may include one or more of method operations 1101, 1102, and 1103, according to some example embodiments. Method operation 1101 may be performed as part (e.g., a precursor task, a subroutine, or a portion) of method operation 1001, in which the image analysis module 520 determines that the image is better than a different image. At method operation 1101, the image analysis module 520 determines that the image is better than a different image based on the image being of a person display type (e.g., the item depicted in the image is displayed using a human model).

Method operation 1102 may be performed as part (e.g., a precursor task, a subroutine, or a portion) of method operation 1001, in which the image analysis module 520 determines that the image is better than a different image. At method operation 1102, the image analysis module 520 determines that the image is better than a different image based on the image being of a mannequin display type (e.g., the item depicted in the image is displayed using a mannequin).

Method operation 1103 may be performed as part (e.g., a precursor task, a subroutine, or a portion) of method operation 1001, in which the image analysis module 520 determines that the image is better than a different image. At method operation 1103, the image analysis module 520 determines that the image is better than a different image based on the image being of a flat display type (e.g., the item depicted in the image is displayed flat, without using a human model or a mannequin).

Figure 12:
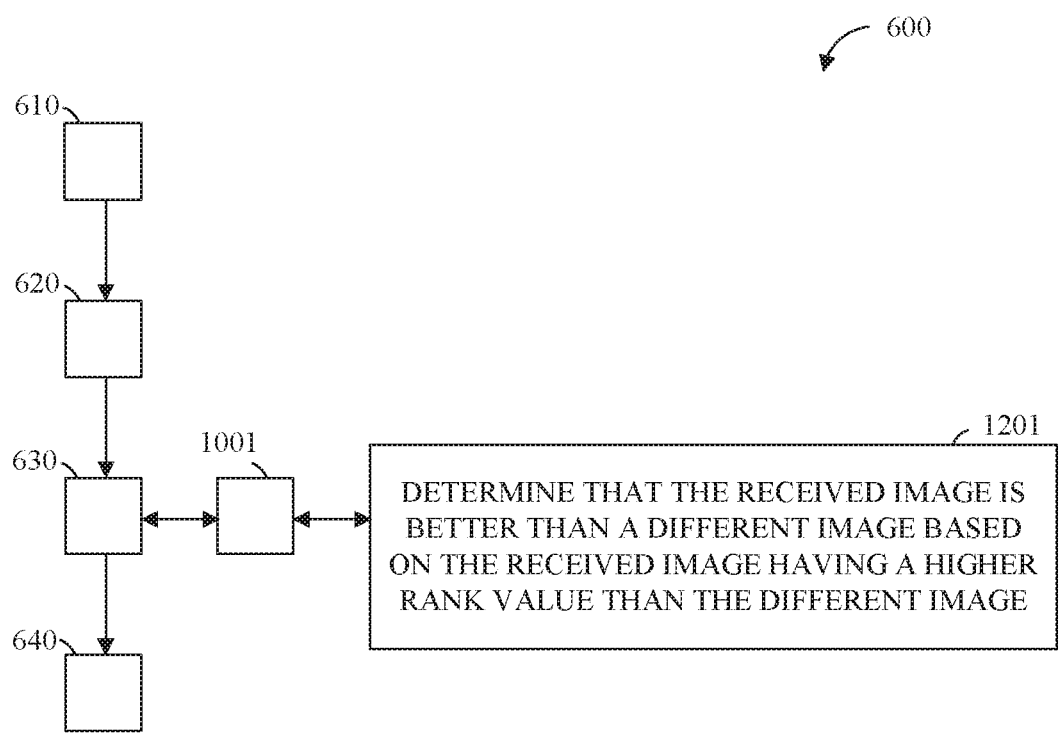

As shown in FIG. 12, the method 600 may include method operation 1201. Method operation 1201 may be performed as part (e.g., a precursor task, a subroutine, or a portion) of method operation 1001, in which the image analysis module 520 determines that the image is better than a different image. At method operation 1201, the image analysis module 520 determines that the image is better than a different image based on the image having a higher rank value than the different image. The image analysis module 520 may rank a plurality of images received from users (e.g., sellers) according to one or more ranking rules. The result of the ranking may identify a particular order of images.

In some example embodiments, the image and the different image may be ranked within a category of images to which the image and the different image belong based on their corresponding value of the display type attribute, as described above with respect to FIG. 4. For example, if the image and the different image both use the person display type to display the items depicted in the images, the image and different image may be ranked within the person category of images. The images within a category may, in some example embodiments, be ranked based on the image score values of the images within the particular category.

In some example embodiments, the image and the different image may be ranked globally (e.g., ranked regardless of categories to which the images may belong) based on an image appeal score value. In some example embodiments, the image analysis module 520 determines the image appeal score value of an image using a particular formula based on the classification of the image.

For example, the user preference for each PMF is P, M, and F (correspond to the 0.37, 0.31, 0.31 values in Table 4 above). The confidence score value is C. If the image is classified as P, the formula is:

$P \times C + M \times (1-C)/2 + F \times (1-C)/2.$

Similarly, if the image is classified as M, the formula is:

$P \times (1-C)/2 + M \times C + F \times (1-C)/2.$

Similarly, if the image is classified as F, the formula is:

$P \times (1-C)/2 + M \times (1-C)/2 + F \times C.$

For example, based on an analysis of the user behavior data, the reference score values for images of different display types may be as follows: P=0.37, M=0.31, and F=0.31. If a given image A is classified as P-type, with the confidence score value of 0.7, then the image appeal score value of the image A equals $P \times C + M \times (1-C)/2 + F \times (1-C)/2 = 0.37 \times 0.7 + 0.31 \times (1-0.7)/2 + 0.31 \times (1-0.7)/2.$ The image appeal score value of the image A may be further combined with the low-level-quality score value of the image A to compute a final score value. In some example embodiments, the final score value is used to determine a global ranking of a plurality of images.

The combining of the image appeal score value and of the low-level-quality-score value may include, in some instances, multiplying the image appeal score value of the image A and the low-level-quality-score value of the image A to compute the final score value of the image A. The combining of the image appeal score value of the image A and of the low-level-quality-score value of the image A may include, in some instances, assigning particular weights to the image appeal score value of the image A and to the low-level-quality-score value of the image A, according to a weight assigning rule, to generate a weighted image appeal score value of the image A and a weighted low-level-quality-score value of the image A. The combining may further include adding the weighted image appeal score value of the image A and the weighted low-level-quality-score value of the image A to compute the final score value of the image A. In some example embodiments, the particular weights may be selected during the analysis of the user behavior data. Some or all of the scores' values (e.g., the confidence score value, the image score value, or the final score value) attributed to an image may be stored in one or more records of a database (e.g., the database 126).

Figure 13:
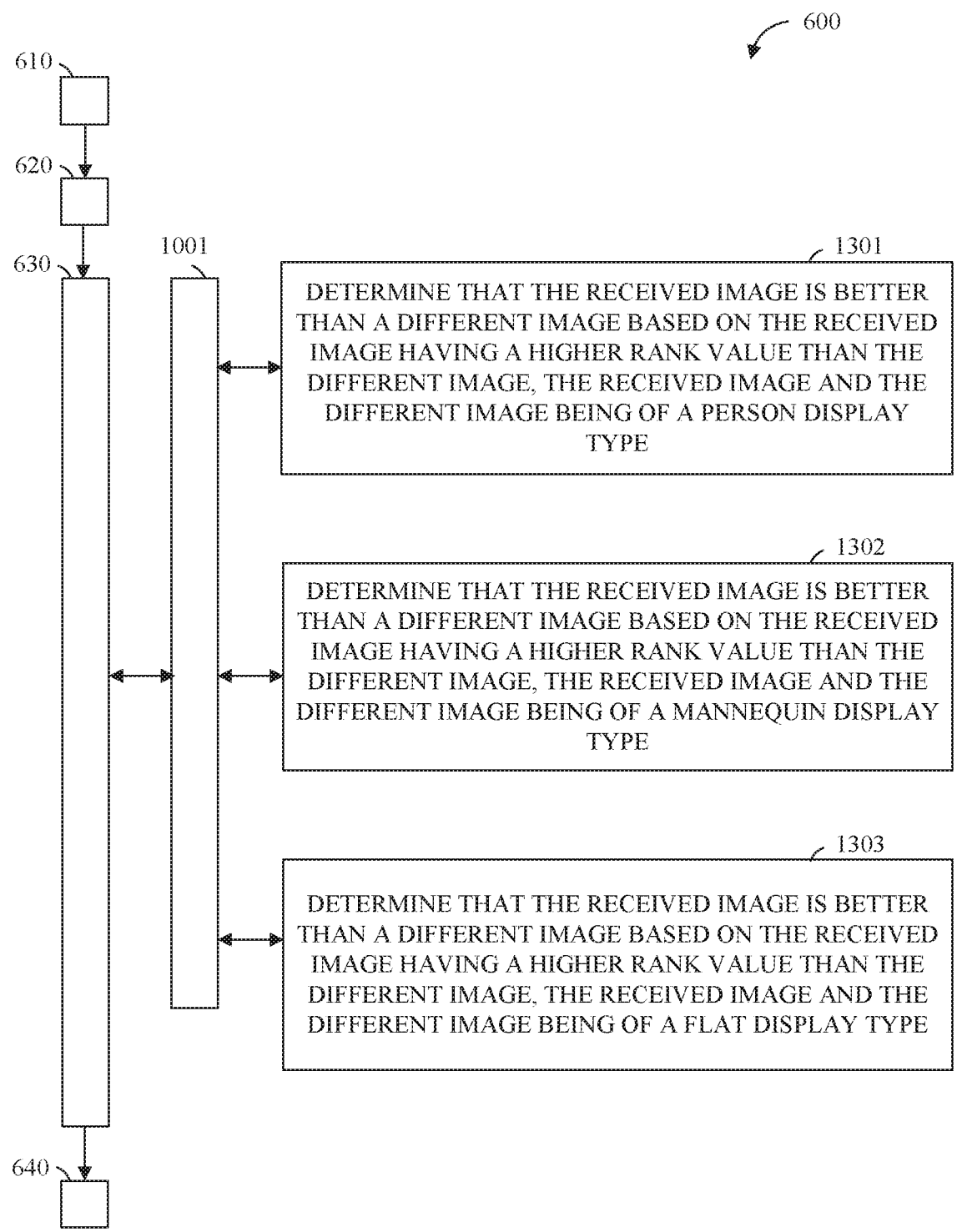

As shown in FIG. 13, the method 600 may include one or more of the method operations 1301, 1302, and 1303, according to some example embodiments. Method operation 1301 may be performed as part (e.g., a precursor task, a subroutine, or a portion) of method operation 1001, in which the image analysis module 520 determines that the image is better than a different image. At method operation 1301, the image analysis module 520 determines that the image is better than a different image based on the image having a higher rank value than the different image, the image and the different image being of a person display type.

Method operation 1302 may be performed as part (e.g., a precursor task, a subroutine, or a portion) of method operation 1001, in which the image analysis module 520 determines that the image is better than a different image. At method operation 1302, the image analysis module 520 determines that the image is better than a different image based on the image having a higher rank value than the different image, the image and the different image being of a mannequin display type.

Method operation 1303 may be performed as part (e.g., a precursor task, a subroutine, or a portion) of method operation 1001, in which the image analysis module 520 determines that the image is better than a different image. At method operation 1303, the image analysis module 520 determines that the image is better than a different image based on the image having a higher rank value than the different image, the image and the different image being of a flat display type.

Figure 14:
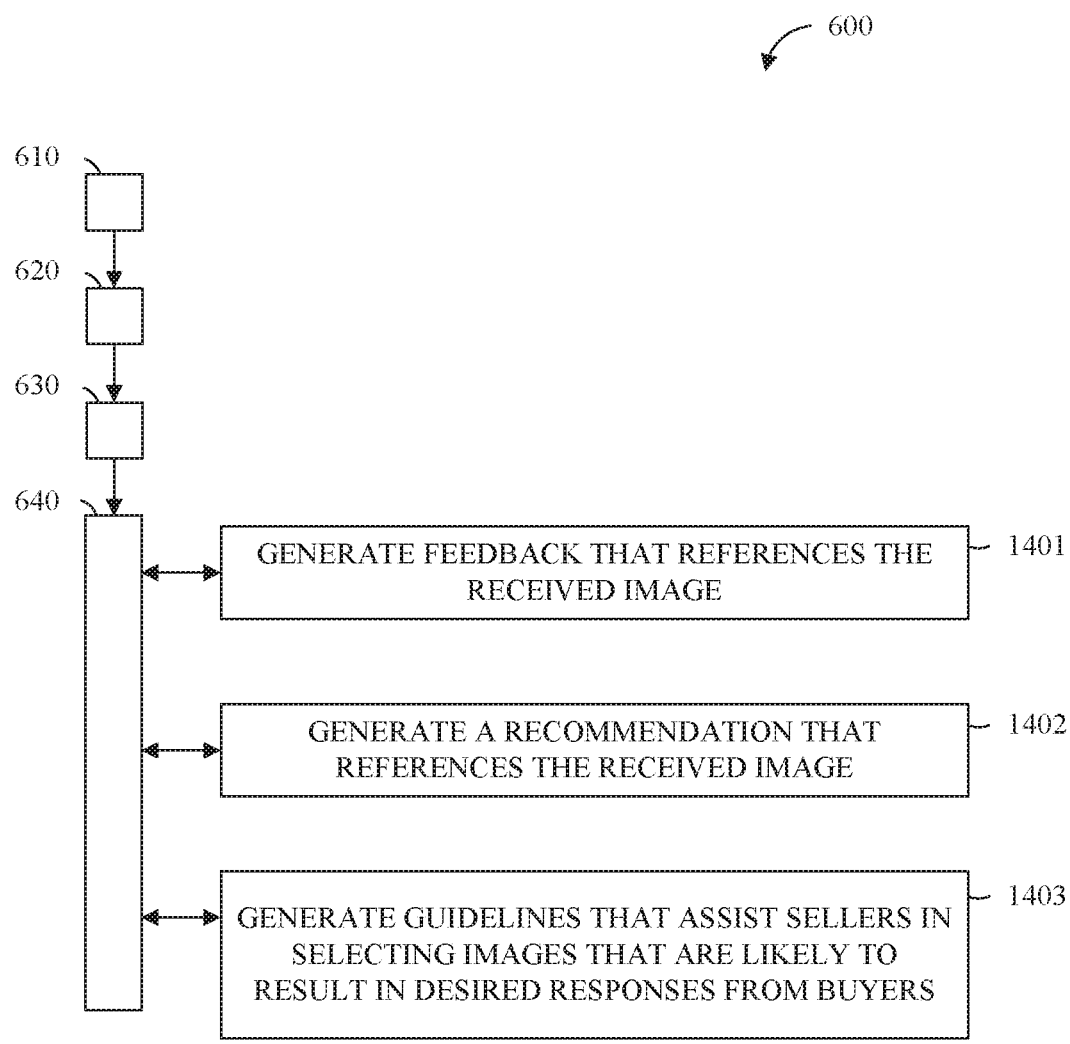

As shown in FIG. 14, the method 600 may include one or more of method operations 1401, 1402, and 1403, according to some example embodiments. Method operation 1401 may be performed as part (e.g., a precursor task, a subroutine, or a portion) of method operation 640, in which the output module 540 generates an output that references the image. At method operation 1401, the output module 540 generates feedback that references the image. The feedback may include a result of the image evaluation of the image (e.g., an evaluation of the image to determine the likelihood of a user, who sees the image, engaging in an interest-manifesting action in relation to the image or the item), an explanation of the image evaluation results, a report of the evaluation of the image, a comparison of a plurality of images received from the seller, a comparison of the image submitted by the seller and the images submitted by other sellers (e.g., based on the image score values or the image ranking values of the respective images), examples of good or bad images, or a suitable combination thereof.

Method operation 1402 may be performed as part (e.g., a precursor task, a subroutine, or a portion) of method operation 640, in which the output module 540 generates an output that references the image. At method operation 1402, the output module 540 generates a recommendation that references the image. The recommendation may include a suggestion for an improved image of the item. The improved image of the item may increase a likelihood of obtaining a desired result from a user (e.g., a potential buyer), such as engaging in an interest-manifesting activity in relation to the image or the item depicted in the image (e.g., clicking on the image or buying the item). The suggestion, in some instances, may include a description of changes that may be made to a number of characteristics (e.g., image attributes) of the image received from the seller.

The recommendation may include a result of the image evaluation of the image (e.g., an evaluation of the image to determine the likelihood of a user, who sees the image, engaging in an interest-manifesting action in relation to the image or the item), an explanation of the image evaluation results, a comparison of a plurality of images received from the seller, a report of the evaluation of the image, a comparison of the image submitted by the seller and the images submitted by other sellers (e.g., based on the image score values or the image ranking value of the respective images), a suggestion to select a more effective display type to display the item in the image, a suggestion to modify the values of one or more other image attributes (e.g., better lighting, a white background, professional photography, fewer items shown in the image, or a better image composition), a set of guidelines to assist the seller in making a decision on how to improve the image depicting the item (e.g., a cost-benefit analysis of different image improving options), examples of good or bad images, or a suitable combination thereof.

Method operation 1403 may be performed as part (e.g., a precursor task, a subroutine, or a portion) of method operation 640, in which the output module 540 generates an output that references the image. At method operation 1403, the output module 540 generates a set of guidelines that assist sellers in selecting images that are likely to result in desired responses from buyers. In some example embodiments, the set of guidelines may describe suggestions how to generate or select quality images that may facilitate the increase in sales of the items depicted in the images. The guidelines may be provided (e.g., displayed) to the sellers of the items, for example, at an e-commerce site where the sellers may market or sell their items. In some example embodiments, the guidelines are provided to the sellers before the sellers transmit (e.g., upload) images to the e-commerce site. In certain example embodiments, the guidelines are provided to the sellers after the sellers transmit (e.g., upload) images to the e-commerce site. The set of guidelines may be customized for particular sellers based on the results of the evaluation of the images received from the particular sellers. For example, upon the image analysis module 520 completing the image evaluation of an image received from a seller and determining that the image may require improvement, the output module 540 generates a customized set of guidelines that may assist the seller in selecting an image that is likely to result in desired responses from buyers. The communication module 550 may display the set of guidelines to the seller via a device of the seller.

In certain example embodiments, the output module 540 may determine, based on the image score value of the image received from the seller, what type of output to generate. For example, the image analysis module 520 may determine, based on the extracted visual features of the image that the image utilizes the P-type display to depict the item of clothing. Based on the image utilizing the P-type display, the image analysis module 520 may assign a high image score value to the image (as compared to other images that utilize the M-type or F-type). The output module 540 may determine, based on the image score value of the image, that the output that references the image may include feedback that references the image (for instance, feedback with respect to how the image compares (e.g., positively) to other images submitted by other sellers) but may not include a recommendation how to improve the image based on the image already having a high image score value.

According to various example embodiments, one or more of the methodologies described herein may facilitate the evaluation of images depicting items for sale online. Moreover, one or more of the methodologies described herein may facilitate providing recommendations for improving the images depicting the items for sale online. Hence, one or more the methodologies described herein may facilitate improving sales of the items depicted in the images.

When these effects are considered in aggregate, one or more of the methodologies described herein may obviate a need for certain efforts or resources that otherwise would be involved in evaluating images of items for sale online. Efforts expended by a provider of such images (e.g., the seller) in evaluating such images may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Example Mobile Device

Figure 15:
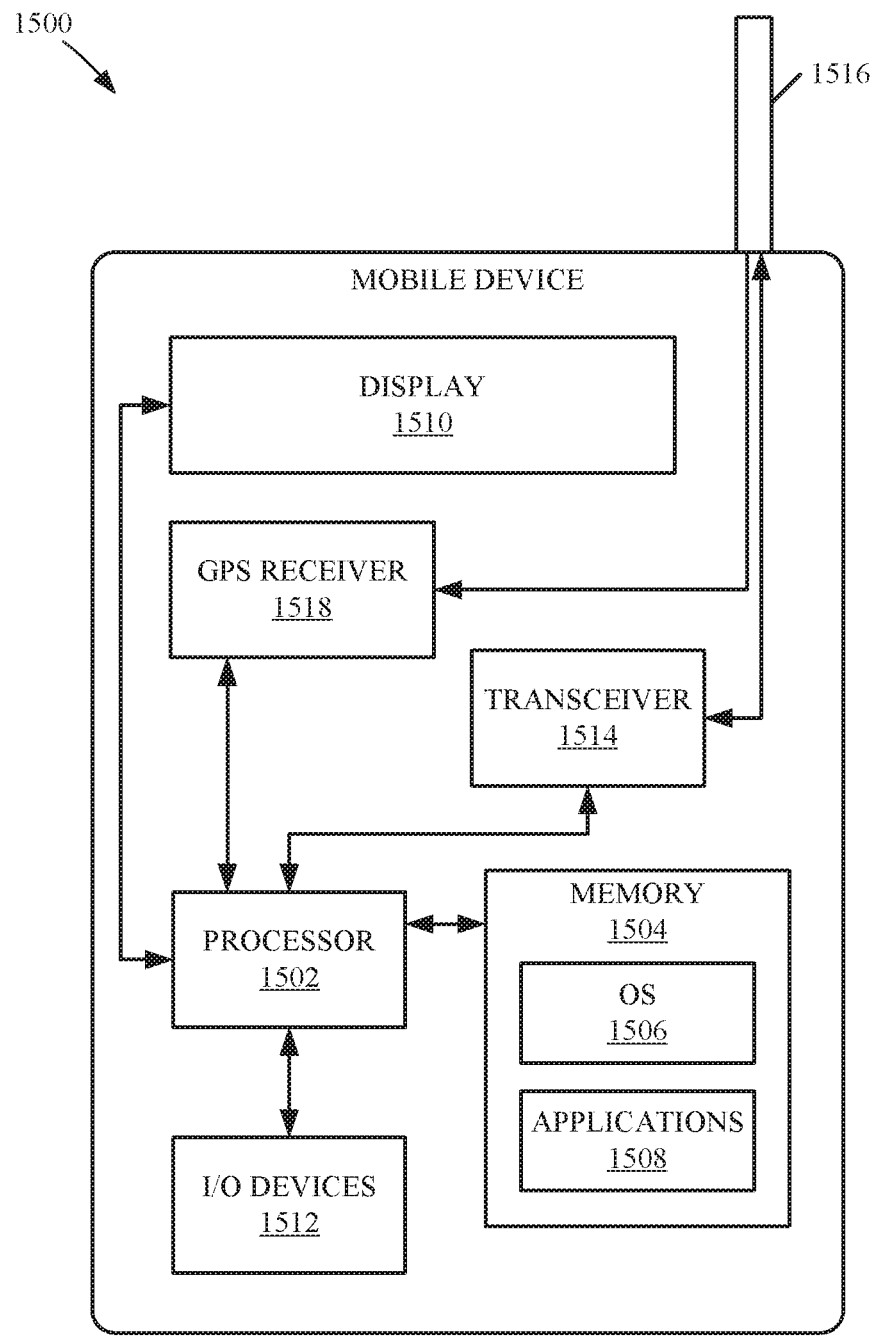
FIG. 15 is a block diagram illustrating a mobile device, according to some example embodiments.

FIG. 15 is a block diagram illustrating a mobile device 1500, according to an example embodiment. The mobile device 1500 may include a processor 1502. The processor 1502 may be any of a variety of different types of commercially available processors 1502 suitable for mobile devices 1500 (for example, an XScale architecture microprocessor, a microprocessor without interlocked pipeline stages (MIPS) architecture processor, or another type of processor 1502). A memory 1504, such as a random access memory (RAM), a flash memory, or other type of memory, is typically accessible to the processor 1502. The memory 1504 may be adapted to store an operating system (OS) 1506, as well as application programs 1508, such as a mobile location enabled application that may provide LBSs to a user. The processor 1502 may be coupled, either directly or via appropriate intermediary hardware, to a display 1510 and to one or more input/output (I/O) devices 1512, such as a keypad, a touch panel sensor, a microphone, and the like.

Similarly, in some embodiments, the processor 1502 may be coupled to a transceiver 1514 that interfaces with an antenna 1516. The transceiver 1514 may be configured to both transmit and receive cellular network signals, wireless data signals, or other types of signals via the antenna 1516, depending on the nature of the mobile device 1500. Further, in some configurations, a GPS receiver 1518 may also make use of the antenna 1516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 1502 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1502 or other programmable processor 1502) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1502 configured using software, the general-purpose processor 1502 may be configured as respective different hardware-implemented modules at different times. Software may accordingly configure a processor 1502, for example, to constitute a particular hardware-implemented module at one instance of time and to constitute a different hardware-implemented module at different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1502 that are temporarily configured (e.g., by software) or permanently configured to perform the relevant operations. Whether temporarily or permanently configured, such processors 1502 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1502 or processor-implemented modules. The performance of certain of the operations may be distributed among the one or more processors 1502 or processor-implemented modules, not only residing within a single machine, but deployed across a number of machines. In some example embodiments, the one or more processors 1502 or processor-implemented modules may be located in a single location (e.g., within a home environment, an office environment or as a server farm), while in other embodiments the one or more processors 1502 or processor-implemented modules may be distributed across a number of locations.

The one or more processors 1502 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1502, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1502 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 1502), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
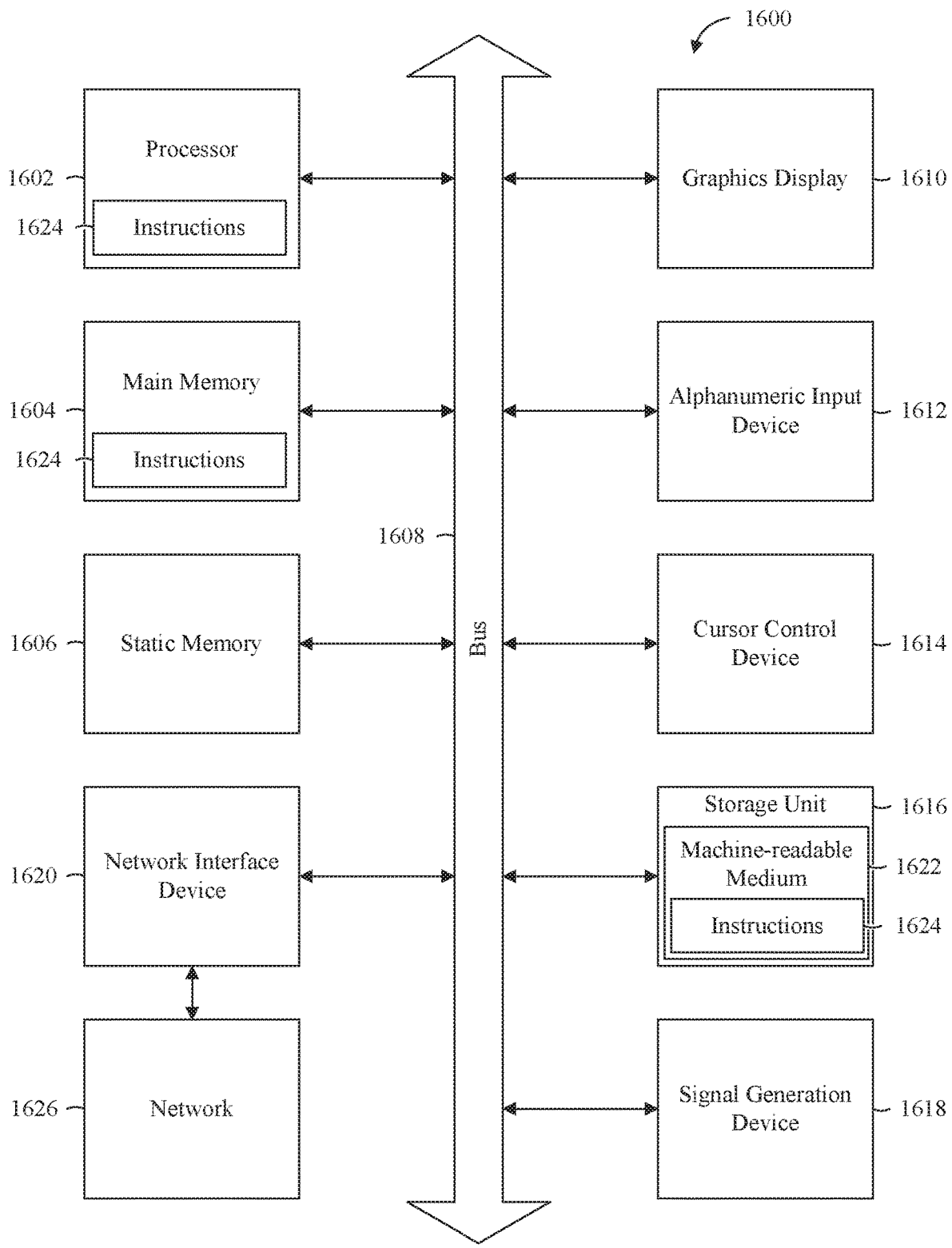
FIG. 16 is a block diagram illustrating components of a machine, according to some example embodiments, able to read instructions from a machine-readable medium and perform any one or more of the methodologies discussed herein.

FIG. 16 is a block diagram illustrating components of a machine 1600, according to some example embodiments, able to read instructions 1624 from a machine-readable medium 1622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 16 shows the machine 1600 in the example form of a computer system (e.g., a computer) within which the instructions 1624 (e.g., software, a program, an application, an applet, an app, or other executable code) for causing the machine 1600 to perform any one or more of the methodologies discussed herein may be executed, in whole or in part.

In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a distributed (e.g., peer-to-peer) network environment. The machine 1600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include any collection of machines that individually or jointly execute the instructions 1624 to perform all or part of any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The processor 1602 may contain microcircuits that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein.

The machine 1600 may further include a graphics display 1610 (e.g., a plasma display panel (PDP), a light emitting diode (LED) display, a liquid crystal display (LCD), a projector, a cathode ray tube (CRT), or any other display capable of displaying graphics or video). The machine 1600 may also include an alphanumeric input device 1612 (e.g., a keyboard or keypad), a cursor control device 1614 (e.g., a mouse, a touchpad, a trackball, a joystick, a motion sensor, an eye tracking device, or other pointing instrument), a storage unit 1616, an audio generation device 1618 (e.g., a sound card, an amplifier, a speaker, a headphone jack, or any suitable combination thereof), and a network interface device 1620.

The storage unit 1616 includes the machine-readable medium 1622 (e.g., a tangible and non-transitory machine-readable storage medium) on which are stored the instructions 1624 embodying any one or more of the methodologies or functions described herein. The instructions 1624 may also reside, completely or at least partially, within the main memory 1604, within the processor 1602 (e.g., within the processor's cache memory), or both, before or during execution thereof by the machine 1600. Accordingly, the main memory 1604 and the processor 1602 may be considered machine-readable media (e.g., tangible and non-transitory machine-readable media). The instructions 1624 may be transmitted or received over the network 1626 via the network interface device 1620. For example, the network interface device 1620 may communicate the instructions 1624 using any one or more transfer protocols (e.g., hypertext transfer protocol (HTTP)).

In some example embodiments, the machine 1600 may be a portable computing device, such as a smart phone or tablet computer, and have one or more additional input components 1630 (e.g., sensors or gauges). Examples of such input components 1630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media a centralized or distributed database, or associated caches and servers) able to store instructions. The term "machine-readable medium" shall also be taken to include any medium, or combination of multiple media, that is capable of storing the instructions 1624 for execution by the machine 1600, such that the instructions 1624, when executed by one or more processors of the machine 1600 (e.g., processor 1602), cause the machine 1600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   a non-transitory machine-readable medium for storing instructions that, when executed by one or more hardware processors of a machine, cause the one or more hardware processors to perform operations comprising:
   receiving an image of an item from a client device, the item to be included in a publication published by a web server of a publication system;
   extracting one or more visual features from the received image;
   determining that the item included in the received image is of a particular type of item based on the extracted one or more visual features;
   accessing user behavior data pertaining to interactions by a plurality of users with a plurality of test images pertaining to the particular type of item;
   identifying an image attribute of the received image;
   generating a suggestion to improve the image attribute based on the particular type of item;
   generating, based on determining that the item included in the received image is of the particular type of item, a recommendation comprising a recommended presentation type for the item for publication based on the particular type of item and results of an analysis performed on the interactions by the plurality of users, the recommended presentation type indicating a style in which the item is displayed within the publication published by the web server of the publication system, wherein the recommendation includes the suggestion; and
   providing the recommendation to the client device.

2. The system of claim 1, wherein the particular type of item corresponds to a clothing category,
   wherein the style comprises one of a flat presentation, a mannequin presentation, and a person presentation, and
   wherein the recommendation of the recommended presentation type for the clothing category is based on a user behavior analysis for the clothing category, the user behavior analysis comprising an analysis of displayed items, clicked items, and unclicked items for each style.

3. The system of claim 1, wherein the operations further comprise:
   storing the results of the analysis performed on the interactions in a database.

4. The system of claim 1, wherein the operations further comprise:
   generating, based on determining that the item included in the received image is of the particular type of item, an output for display in the client device, the output including a reference to the received image and the recommended presentation type for the item included in the received image of the item based on results of analysis of interactions of the system with other client devices.

5. The system of claim 4, wherein the recommended presentation type corresponds to an attribute-value pair of one or more attribute-value pairs associated with one or more images of the plurality of test images corresponding to a user behavior, and wherein the operations further comprise:
   determining, for the received image, a likelihood of a user engaging in the user behavior in relation to the received image based on one of the one or more attribute-value pairs associated with the received image.

6. The system of claim 1, wherein the operations further comprise: determining a likelihood of a user engaging in a user behavior based on a publication, by the web server of the publication system, of an image of the particular type of item using the recommended presentation type, wherein the recommendation further includes a reference to the likelihood of a user engaging in the user behavior.

7. The system of claim 1, wherein the operations further comprise:
   performing an evaluation of the received image based on an image analysis of the received image, the image analysis including identifying one or more image attributes and one or more values that correspond to the one or more image attributes, the one or more image attributes comprising at least one of an image quality attribute and a display type attribute, the display type attribute indicating a visual context in which the item is displayed.

8. The system of claim 7, wherein the determining that the item included in the received image is of the particular type of item includes classifying the received image into a category based on the one or more image attributes and the one or more values that correspond to the one or more image attributes.

9. The system of claim 8, wherein the recommendation includes a suggestion of an action pertaining to the received image to increase a likelihood of a user engaging in a user behavior.

10. A method comprising:
receiving an image of an item from a client device, the item to be included in a publication published by a web server of a publication system;
extracting, by one or more processors, one or more visual features from the received image;
determining, by the one or more processors, that the item included in the received image is of a particular type of item based on the extracted one or more visual features;
accessing user behavior data pertaining to interactions by a plurality of users with a plurality of test images pertaining to the particular type of item;
identifying an image attribute of the received image;
generating, by the one or more processors, a suggestion to improve the image attribute based on the particular type of item;
generating, based on determining that the item included in the received image is of the particular type of item, a recommendation comprising a recommended presentation type for the item for publication based on the particular type of item and results of an analysis performed on the interactions by the plurality of users, the recommended presentation type indicating a style in which the item is displayed within the publication published by the web server of the publication system, wherein the recommendation includes the suggestion; and
providing, by the one or more processors, the recommendation to the client device.

11. The method of claim 10, wherein the particular type of item corresponds to a clothing category,
wherein the style comprises one of a flat presentation, a mannequin presentation, and a person presentation, and
wherein the recommendation of the recommended presentation type for the clothing category is based on a user behavior analysis for the clothing category, the user behavior analysis comprising an analysis of displayed items, clicked items, and unclicked items for each style.

12. The method of claim 10, further comprising:
storing the results of the analysis performed on the interactions in a database.

13. The method of claim 10, further comprising:
generating, based on determining that the item included in the received image is of the particular type of item, an output for display in the client device, the output including a reference to the received image and the recommended presentation type for the item included in the received image of the item based on results of analysis of interactions of the system with other client devices.

14. The method of claim 13, wherein the recommended presentation type corresponds to an attribute-value pair of one or more attribute-value pairs associated with one or more images of the plurality of test images corresponding to the user behavior data, the method further comprising:
determining, for the received image, a likelihood of a user engaging in the user behavior in relation to the received image based on one of the one or more attribute-value pairs associated with the received image.

15. The method of claim 10, further comprising:
determining a likelihood of a user engaging in a user behavior based on a publication, by the web server of the publication system, of an image of the particular type of item using the recommended presentation type, wherein the recommendation further includes a reference to the likelihood of a user engaging in the user behavior.

16. The method of claim 10, further comprising:
performing an evaluation of the received image based on an image analysis of the received image, the image analysis including identifying one or more image attributes and one or more values that correspond to the one or more image attributes, the one or more image attributes comprising at least one of an image quality attribute and a display type attribute, the display type attribute indicating a visual context in which the item is displayed.

17. The method of claim 16, wherein the determining that the item included in the received image is of the particular type of item includes classifying the received image into a category based on the one or more image attributes and the one or more values that correspond to the one or more image attributes,
wherein the recommendation includes a suggestion of an action pertaining to the received image to increase a likelihood of a user engaging in a user behavior.

18. A non-transitory computer-readable storage medium storing instructions which, when executed by one or more hardware processors of a machine, cause the machine to perform operations comprising:
receiving an image of an item from a client device, the item to be included in a publication published by a web server of a publication system;
extracting one or more visual features from the received image;
determining that the item included in the received image is of a particular type of item based on the extracted one or more visual features;
accessing user behavior data pertaining to interactions by a plurality of users with a plurality of test images pertaining to the particular type of item;
identifying an image attribute of the received image;
generating a suggestion to improve the image attribute based on the particular type of item;
generating, based on determining that the item included in the received image is of the particular type of item, a recommendation comprising a recommended presentation type for the item for publication based on the particular type of item and results of an analysis performed on the interactions by the plurality of users, the recommended presentation type indicating a style in which the item is displayed within the publication published by the web server of the publication system, wherein the recommendation includes the suggestion; and
providing the recommendation to the client device.

* * * * *